United States Patent
Anelli et al.

(10) Patent No.: US 9,644,248 B2
(45) Date of Patent: May 9, 2017

(54) HEAVY WALL QUENCHED AND TEMPERED SEAMLESS STEEL PIPES AND RELATED METHOD FOR MANUFACTURING SAID STEEL PIPES

(71) Applicant: Dalmine S.p.A., Dalmine (IT)

(72) Inventors: Ettore Anelli, Dalmine (IT); Emanuele Paravicini Bagliani, Dalmine (IT); Stefano Fare, Dalmine (IT)

(73) Assignee: DALMINE S.P.A., Dalmine (IT)

( * ) Notice: Subject to any disclaimer, the term of this patent is extended or adjusted under 35 U.S.C. 154(b) by 412 days.

(21) Appl. No.: 14/248,116

(22) Filed: Apr. 8, 2014

(65) Prior Publication Data

US 2014/0299235 A1    Oct. 9, 2014

(30) Foreign Application Priority Data

Apr. 8, 2013 (EP) .................................... 13162722
Apr. 3, 2014 (EP) .................................... 14163358

(51) Int. Cl.
*C21D 8/10* (2006.01)
*C21D 9/08* (2006.01)
(Continued)

(52) U.S. Cl.
CPC ............. *C21D 8/105* (2013.01); *C21D 9/08* (2013.01); *C22C 38/001* (2013.01);
(Continued)

(58) Field of Classification Search
CPC .... C21D 8/105; C21D 9/08; C21D 2211/002; C21D 2211/005; C22C 38/001;
(Continued)

(56) References Cited

U.S. PATENT DOCUMENTS 3,316,395 A    4/1967 Lavin
3,316,396 A    4/1967 Lavin
(Continued)

FOREIGN PATENT DOCUMENTS

AR    0050159 A1    10/2006
AT    388791 B    8/1989
(Continued)

OTHER PUBLICATIONS

"Seamless Steel Tubes for Pressure Purposes≥Technical Delivery Conditions—Part 1: Non-alloy Steel Tubes with Specified Room Temperature Properties" British Standard BS EN 10216-1:2002 E:1-26, published May 2002.
(Continued)

*Primary Examiner* — Helene Klemanski
(74) *Attorney, Agent, or Firm* — Knobbe Martens Olson and Bear LLP

(57) ABSTRACT

Disclosed herein are embodiments of a seamless quenched and tempered steel pipe having a wall thickness (WT) higher than or equal to 35 mm and lower than or equal to 80 mm. Embodiments of the steel pipe can comprise C, Mn, Cr, Ni, Mo, Al, Ca, N, Nb, Ti, Zr, and Ta. Further, for some embodiments of the steel pipe wherein, defining a first parameter $P1=50\times C+Cr+10\times Mo+70\times V$, the chemical composition can satisfy a first condition $P1\leq 8.0$.

18 Claims, 2 Drawing Sheets

(51) Int. Cl.
  *C22C 38/02* (2006.01)
  *C22C 38/04* (2006.01)
  *C22C 38/06* (2006.01)
  *C22C 38/42* (2006.01)
  *C22C 38/44* (2006.01)
  *C22C 38/48* (2006.01)
  *C22C 38/50* (2006.01)
  *F16L 9/02* (2006.01)
  *C22C 38/00* (2006.01)

(52) U.S. Cl.
  CPC ............ *C22C 38/002* (2013.01); *C22C 38/02* (2013.01); *C22C 38/04* (2013.01); *C22C 38/06* (2013.01); *C22C 38/42* (2013.01); *C22C 38/44* (2013.01); *C22C 38/48* (2013.01); *C22C 38/50* (2013.01); *F16L 9/02* (2013.01); *C21D 2211/002* (2013.01); *C21D 2211/005* (2013.01)

(58) Field of Classification Search
  CPC ....... C22C 38/002; C22C 38/02; C22C 38/04; C22C 38/06; C22C 38/42; C22C 38/44; C22C 38/48; C22C 38/50; F16L 9/02
  USPC .................................. 148/504, 330, 332, 335
  See application file for complete search history.

(56) References Cited

U.S. PATENT DOCUMENTS

| | | |
|---|---|---|
| 3,325,174 A | 6/1967 | Weaver |
| 3,362,731 A | 1/1968 | Gasche et al. |
| 3,366,392 A | 1/1968 | Kennel |
| 3,413,166 A | 11/1968 | Zackay et al. |
| 3,489,437 A | 1/1970 | Duret |
| 3,512,789 A | 5/1970 | Tanner |
| 3,552,781 A | 1/1971 | Helland |
| 3,572,777 A | 3/1971 | Blose et al. |
| 3,575,430 A | 4/1971 | Alpine |
| 3,592,491 A | 7/1971 | Glover |
| 3,599,931 A | 8/1971 | Hanson |
| 3,655,465 A | 4/1972 | Snape et al. |
| 3,733,093 A | 5/1973 | Seiler |
| 3,810,793 A | 5/1974 | Heller |
| 3,854,760 A | 12/1974 | Duret |
| 3,889,989 A | 6/1975 | Legris |
| 3,891,224 A | 6/1975 | Ditcher |
| 3,893,919 A | 7/1975 | Flegel et al. |
| 3,915,697 A | 10/1975 | Giuliani et al. |
| 3,918,726 A | 11/1975 | Kramer |
| 3,986,731 A | 10/1976 | DeHoff |
| 4,014,568 A | 3/1977 | Carter et al. |
| 4,147,368 A | 4/1979 | Baker et al. |
| 4,163,290 A | 7/1979 | Sutherlin et al. |
| 4,219,204 A | 8/1980 | Pippert |
| 4,231,555 A | 11/1980 | Saito |
| 4,299,412 A | 11/1981 | Parmann |
| 4,305,059 A | 12/1981 | Benton |
| 4,310,163 A | 1/1982 | Pippert |
| 4,336,081 A | 6/1982 | Hijikata et al. |
| 4,345,739 A | 8/1982 | Wheatley |
| 4,354,882 A | 10/1982 | Greer |
| 4,366,971 A | 1/1983 | Lula |
| 4,368,894 A | 1/1983 | Parmann |
| 4,373,750 A | 2/1983 | Mantelle et al. |
| 4,376,528 A | 3/1983 | Ohshimatani et al. |
| 4,379,482 A | 4/1983 | Suzuki et al. |
| 4,384,737 A | 5/1983 | Reusser |
| 4,406,561 A | 9/1983 | Ewing |
| 4,407,681 A | 10/1983 | Ina et al. |
| 4,426,095 A | 1/1984 | Buttner |
| 4,445,265 A | 5/1984 | Olson et al. |
| 4,473,471 A | 9/1984 | Robichaud et al. |
| 4,475,839 A | 10/1984 | Strandberg |
| 4,491,725 A | 1/1985 | Pritchard |
| 4,506,432 A | 3/1985 | Smith |
| 4,526,628 A | 7/1985 | Ohno et al. |
| 4,527,815 A | 7/1985 | Frick |
| 4,564,392 A | 1/1986 | Ohhashi et al. |
| 4,570,982 A | 2/1986 | Blose et al. |
| 4,591,195 A | 5/1986 | Chelette et al. |
| 4,592,558 A | 6/1986 | Hopkins |
| 4,601,491 A | 7/1986 | Bell, Jr. et al. |
| 4,602,807 A | 7/1986 | Bowers |
| 4,623,173 A | 11/1986 | Handa et al. |
| 4,629,218 A | 12/1986 | Dubois |
| 4,662,659 A | 5/1987 | Blose et al. |
| 4,674,756 A | 6/1987 | Fallon et al. |
| 4,688,832 A | 8/1987 | Ortloff et al. |
| 4,706,997 A | 11/1987 | Carstensen |
| 4,710,245 A | 12/1987 | Roether |
| 4,721,536 A | 1/1988 | Koch et al. |
| 4,758,025 A | 7/1988 | Frick |
| 4,762,344 A | 8/1988 | Perkins et al. |
| 4,812,182 A | 3/1989 | Fang et al. |
| 4,814,141 A | 3/1989 | Imai et al. |
| 4,844,517 A | 7/1989 | Beiley et al. |
| 4,856,828 A | 8/1989 | Kessler et al. |
| 4,955,645 A | 9/1990 | Weems |
| 4,958,862 A | 9/1990 | Cappelli et al. |
| 4,988,127 A | 1/1991 | Cartensen |
| 5,007,665 A | 4/1991 | Bovisio et al. |
| 5,067,874 A | 11/1991 | Foote |
| 5,137,310 A | 8/1992 | Noel et al. |
| 5,143,381 A | 9/1992 | Temple |
| 5,154,534 A | 10/1992 | Guerin et al. |
| 5,180,008 A | 1/1993 | Aldridge et al. |
| 5,191,911 A | 3/1993 | Dubois |
| 5,242,199 A | 9/1993 | Hann et al. |
| 5,328,158 A | 7/1994 | Lewis et al. |
| 5,348,350 A | 9/1994 | Blose et al. |
| 5,352,406 A | 10/1994 | Barteri et al. |
| 5,360,239 A | 11/1994 | Klementich |
| 5,449,420 A | 9/1995 | Okada et al. |
| 5,454,883 A | 10/1995 | Yoshie et al. |
| 5,505,502 A | 4/1996 | Smith et al. |
| 5,515,707 A | 5/1996 | Smith |
| 5,538,566 A | 7/1996 | Gallagher |
| 5,592,988 A | 1/1997 | Meroni et al. |
| 5,598,735 A | 2/1997 | Saito et al. |
| 5,653,452 A | 8/1997 | Jarvenkylä |
| 5,712,706 A | 1/1998 | Castore et al. |
| 5,794,985 A | 8/1998 | Mallis |
| 5,810,401 A | 9/1998 | Mosing et al. |
| 5,860,680 A | 1/1999 | Drijver et al. |
| 5,879,030 A | 3/1999 | Clayson et al. |
| 5,879,474 A | 3/1999 | Bhadeshia et al. |
| 5,944,921 A | 8/1999 | Cumino et al. |
| 5,993,570 A | 11/1999 | Gray |
| 6,006,789 A | 12/1999 | Toyooka et al. |
| 6,030,470 A | 2/2000 | Hensger et al. |
| 6,044,539 A | 4/2000 | Guzowski |
| 6,045,165 A | 4/2000 | Sugino et al. |
| 6,056,324 A | 5/2000 | Reimert et al. |
| 6,070,912 A | 6/2000 | Latham |
| 6,173,968 B1 | 1/2001 | Nelson et al. |
| 6,188,037 B1 | 2/2001 | Hamada et al. |
| 6,196,530 B1 | 3/2001 | Muhr et al. |
| 6,217,676 B1 | 4/2001 | Takabe et al. |
| 6,248,187 B1 | 6/2001 | Asahi et al. |
| 6,267,828 B1 | 7/2001 | Kushida et al. |
| 6,311,965 B1 | 11/2001 | Muhr et al. |
| 6,331,216 B1 | 12/2001 | Toyooka et al. |
| 6,347,814 B1 | 2/2002 | Cerruti |
| 6,349,979 B1 | 2/2002 | Noel et al. |
| 6,358,336 B1 | 3/2002 | Miyata |
| 6,384,388 B1 | 5/2002 | Anderson et al. |
| 6,412,831 B1 | 7/2002 | Noel et al. |
| 6,447,025 B1 | 9/2002 | Smith |
| 6,478,344 B2 | 11/2002 | Pallini, Jr. et al. |
| 6,481,760 B1 | 11/2002 | Noel et al. |
| 6,494,499 B1 | 12/2002 | Galle, Sr. et al. |
| 6,514,359 B2 | 2/2003 | Kawano |
| 6,527,056 B2 | 3/2003 | Newman |
| 6,540,848 B2 | 4/2003 | Miyata et al. |

(56) References Cited

U.S. PATENT DOCUMENTS

| | | |
|---|---|---|
| 6,550,822 B2 | 4/2003 | Mannella et al. |
| 6,557,906 B1 | 5/2003 | Carcagno |
| 6,558,484 B1 | 5/2003 | Onoe et al. |
| 6,581,940 B2 | 6/2003 | Dittel |
| 6,632,296 B2 | 10/2003 | Yoshinaga et al. |
| 6,648,991 B2 | 11/2003 | Turconi et al. |
| 6,669,285 B1 | 12/2003 | Park et al. |
| 6,669,789 B1 | 12/2003 | Edelman et al. |
| 6,682,610 B1 | 1/2004 | Inoue |
| 6,683,834 B2 | 1/2004 | Ohara et al. |
| 6,709,534 B2 | 3/2004 | Kusinski et al. |
| 6,752,436 B1 | 6/2004 | Verdillon |
| 6,755,447 B2 | 6/2004 | Galle, Jr. et al. |
| 6,764,108 B2 | 7/2004 | Ernst et al. |
| 6,767,417 B2 | 7/2004 | Fujita et al. |
| 6,814,358 B2 | 11/2004 | Keck |
| 6,851,727 B2 | 2/2005 | Carcagno et al. |
| 6,857,668 B2 | 2/2005 | Otten et al. |
| 6,883,804 B2 | 4/2005 | Cobb |
| 6,905,150 B2 | 6/2005 | Carcagno et al. |
| 6,921,110 B2 | 7/2005 | Morotti et al. |
| 6,958,099 B2 | 10/2005 | Nakamura et al. |
| 6,971,681 B2 | 12/2005 | Dell'Erba et al. |
| 6,991,267 B2 | 1/2006 | Ernst et al. |
| 7,014,223 B2 | 3/2006 | Della Pina et al. |
| 7,066,499 B2 | 6/2006 | Della Pina et al. |
| 7,074,283 B2 | 7/2006 | Omura |
| 7,083,686 B2 | 8/2006 | Itou |
| 7,108,063 B2 | 9/2006 | Carstensen |
| 7,118,637 B2 | 10/2006 | Kusinski et al. |
| 7,182,140 B2 | 2/2007 | Wood |
| 7,214,278 B2 | 5/2007 | Kusinski et al. |
| 7,255,374 B2 | 8/2007 | Carcagno et al. |
| 7,264,684 B2 | 9/2007 | Numata et al. |
| 7,284,770 B2 | 10/2007 | Dell'erba et al. |
| 7,310,867 B2 | 12/2007 | Corbett, Jr. |
| 7,431,347 B2 | 10/2008 | Ernst et al. |
| 7,464,449 B2 | 12/2008 | Santi et al. |
| 7,475,476 B2 | 1/2009 | Roussie |
| 7,478,842 B2 | 1/2009 | Reynolds, Jr. et al. |
| 7,506,900 B2 | 3/2009 | Carcagno et al. |
| 7,621,034 B2 | 11/2009 | Roussie |
| 7,635,406 B2 | 12/2009 | Numata et al. |
| 7,735,879 B2 | 6/2010 | Toscano et al. |
| 7,744,708 B2 | 6/2010 | López et al. |
| 7,753,416 B2 | 7/2010 | Mazzaferro et al. |
| 7,862,667 B2 | 1/2011 | Turconi et al. |
| 8,002,910 B2 | 8/2011 | Tivelli et al. |
| 8,007,601 B2 | 8/2011 | López et al. |
| 8,007,603 B2 | 8/2011 | Garcia et al. |
| 8,016,362 B2 | 9/2011 | Itoga |
| 8,215,680 B2 | 7/2012 | Santi |
| 8,221,562 B2 | 7/2012 | Valdez et al. |
| 8,262,094 B2 | 9/2012 | Beele |
| 8,262,140 B2 | 9/2012 | Santi et al. |
| 8,317,946 B2 | 11/2012 | Arai et al. |
| 8,328,958 B2 | 12/2012 | Turconi et al. |
| 8,328,960 B2 | 12/2012 | Gomez et al. |
| 8,333,409 B2 | 12/2012 | Santi et al. |
| 8,414,715 B2 | 4/2013 | Altschuler et al. |
| 8,544,304 B2 | 10/2013 | Santi |
| 8,636,856 B2 | 1/2014 | Altschuler et al. |
| 8,821,653 B2 | 9/2014 | Anelli et al. |
| 8,840,152 B2 | 9/2014 | Carcagno et al. |
| 9,004,544 B2 | 4/2015 | Carcagno et al. |
| 9,163,296 B2 | 10/2015 | Valdez et al. |
| 9,187,811 B2 | 11/2015 | Gomez et al. |
| 9,188,252 B2 | 11/2015 | Altschuler et al. |
| 9,222,156 B2 | 12/2015 | Altschuler et al. |
| 9,234,612 B2 | 1/2016 | Santi et al. |
| 9,340,847 B2 | 5/2016 | Altschuler et al. |
| 9,383,045 B2 | 7/2016 | Santi et al. |
| 2001/0035235 A1 | 11/2001 | Kawano |
| 2002/0011284 A1 | 1/2002 | Von Hagen et al. |
| 2002/0153671 A1 | 10/2002 | Raymond et al. |
| 2002/0158469 A1 | 10/2002 | Mannella et al. |
| 2003/0019549 A1 | 1/2003 | Turconi et al. |
| 2003/0111146 A1 | 6/2003 | Kusinski et al. |
| 2003/0116238 A1 | 6/2003 | Fujita |
| 2003/0155052 A1 | 8/2003 | Kondo et al. |
| 2003/0165098 A1 | 9/2003 | Ohara et al. |
| 2003/0168859 A1 | 9/2003 | Watts |
| 2004/0118490 A1 | 6/2004 | Klueh et al. |
| 2004/0118569 A1 | 6/2004 | Brill et al. |
| 2004/0131876 A1 | 7/2004 | Ohgami et al. |
| 2004/0139780 A1 | 7/2004 | Cai et al. |
| 2004/0195835 A1 | 10/2004 | Noel et al. |
| 2004/0262919 A1 | 12/2004 | Dutilleul et al. |
| 2005/0012278 A1 | 1/2005 | Delange |
| 2005/0076975 A1 | 4/2005 | Lopez |
| 2005/0087269 A1 | 4/2005 | Merwin |
| 2005/0093250 A1 | 5/2005 | Santi et al. |
| 2005/0166986 A1 | 8/2005 | Dell'erba et al. |
| 2006/0006600 A1 | 1/2006 | Roussie |
| 2006/0124211 A1 | 6/2006 | Takano et al. |
| 2006/0137781 A1 | 6/2006 | Kusinski et al. |
| 2006/0157539 A1 | 7/2006 | Dubois |
| 2006/0169368 A1 | 8/2006 | Lopez et al. |
| 2006/0231168 A1 | 10/2006 | Nakamura et al. |
| 2006/0243355 A1 | 11/2006 | Haiderer et al. |
| 2006/0273586 A1 | 12/2006 | Reynolds, Jr. et al. |
| 2007/0039149 A1 | 2/2007 | Roussie |
| 2007/0089813 A1 | 4/2007 | Tivelli |
| 2007/0137736 A1 | 6/2007 | Omura et al. |
| 2007/0216126 A1 | 9/2007 | Lopez et al. |
| 2007/0246219 A1 | 10/2007 | Mannella et al. |
| 2008/0047635 A1 | 2/2008 | Kondo et al. |
| 2008/0115863 A1 | 5/2008 | McCrink et al. |
| 2008/0129044 A1 | 6/2008 | Carcagno et al. |
| 2008/0219878 A1 | 9/2008 | Kondo et al. |
| 2008/0226396 A1 | 9/2008 | Garcia et al. |
| 2008/0226491 A1 | 9/2008 | Satou et al. |
| 2008/0257459 A1* | 10/2008 | Arai .................. C21D 9/08 148/332 |
| 2008/0264129 A1 | 10/2008 | Cheppe et al. |
| 2008/0303274 A1 | 12/2008 | Mazzaferro et al. |
| 2008/0314481 A1 | 12/2008 | Garcia et al. |
| 2009/0010794 A1 | 1/2009 | Turconi et al. |
| 2009/0047166 A1 | 2/2009 | Tomomatsu et al. |
| 2009/0330807 | 2/2009 | Carcagno et al. |
| 2009/0101242 A1 | 4/2009 | Lopez et al. |
| 2009/0114318 A1 | 5/2009 | Arai et al. |
| 2009/0226491 A1 | 9/2009 | Satou et al. |
| 2010/0068549 A1 | 3/2010 | Agazzi |
| 2010/0136363 A1 | 6/2010 | Valdez et al. |
| 2010/0187808 A1 | 7/2010 | Santi |
| 2010/0193085 A1 | 8/2010 | Garcia |
| 2010/0206553 A1 | 8/2010 | Bailey et al. |
| 2010/0294401 A1 | 11/2010 | Gomez |
| 2010/0319814 A1 | 12/2010 | Perez |
| 2010/0327550 A1 | 12/2010 | Lopez |
| 2011/0042946 A1 | 2/2011 | Santi |
| 2011/0077089 A1 | 3/2011 | Hirai et al. |
| 2011/0097235 A1 | 4/2011 | Turconi et al. |
| 2011/0133449 A1 | 6/2011 | Mazzaferro |
| 2011/0233925 A1 | 9/2011 | Pina |
| 2011/0247733 A1 | 10/2011 | Arai et al. |
| 2011/0259482 A1 | 10/2011 | Peters et al. |
| 2011/0284137 A1 | 11/2011 | Kami et al. |
| 2012/0018056 A1* | 1/2012 | Nakagawa ............ C21D 8/105 148/330 |
| 2012/0199255 A1 | 8/2012 | Anelli |
| 2012/0267014 A1* | 10/2012 | Hitoshio ................ C21D 8/105 148/332 |
| 2013/0000790 A1* | 1/2013 | Arai ...................... C21D 8/105 148/332 |
| 2013/0004787 A1* | 1/2013 | Ishiyama ................ C22C 38/04 148/593 |
| 2013/0264123 A1 | 10/2013 | Altschuler |
| 2014/0021244 A1 | 1/2014 | DuBois |
| 2014/0027497 A1 | 1/2014 | Rowland et al. |
| 2014/0057121 A1 | 2/2014 | Altschuler |
| 2014/0137992 A1* | 5/2014 | Ishiguro ................ C22C 38/04 148/332 |

(56) References Cited

U.S. PATENT DOCUMENTS

| | | | |
|---|---|---|---|
| 2014/0272448 | A1 | 9/2014 | Valdez et al. |
| 2014/0299236 | A1* | 10/2014 | Anelli .................. C21D 8/105 148/504 |
| 2015/0368986 | A1 | 12/2015 | Narikawa |
| 2016/0024625 | A1 | 1/2016 | Valdez |
| 2016/0102856 | A1 | 4/2016 | Minami |
| 2016/0305192 | A1 | 10/2016 | Buhler |

FOREIGN PATENT DOCUMENTS

| | | |
|---|---|---|
| CA | 2319926 | 7/2008 |
| CN | 1401809 | 3/2003 |
| CN | 1487112 | 4/2004 |
| CN | 1292429 | 12/2006 |
| CN | 101480671 | 7/2009 |
| CN | 101542002 | 9/2009 |
| CN | 101613829 A | 12/2009 |
| CN | 101413089 | 11/2010 |
| DE | 3310226 A1 | 10/1984 |
| DE | 4446806 | 5/1996 |
| EA | 010037 | 6/2008 |
| EA | 012256 | 8/2009 |
| EP | 0 032 265 | 7/1981 |
| EP | 0 092 815 | 11/1983 |
| EP | 0 104 720 | 4/1984 |
| EP | 0 159 385 | 10/1985 |
| EP | 0 309 179 | 3/1989 |
| EP | 0 340 385 | 11/1989 |
| EP | 0 329 990 | 11/1992 |
| EP | 0 658 632 | 6/1995 |
| EP | 0 753 595 | 1/1997 |
| EP | 0 788 850 | 8/1997 |
| EP | 0 828 007 A | 3/1998 |
| EP | 0 989 196 | 3/2000 |
| EP | 1 008 660 | 6/2000 |
| EP | 01027944 B1 | 8/2000 |
| EP | 1 065 423 | 1/2001 |
| EP | 828 007 | 11/2001 |
| EP | 1 269 059 | 1/2003 |
| EP | 1 277 848 | 1/2003 |
| EP | 1 288 316 | 3/2003 |
| EP | 1 296 088 | 3/2003 |
| EP | 1 362977 | 11/2003 |
| EP | 1 413 639 | 4/2004 |
| EP | 1 182 268 | 9/2004 |
| EP | 1 705 415 | 9/2006 |
| EP | 1 717 324 | 11/2006 |
| EP | 1 726 861 | 11/2006 |
| EP | 1876254 | 1/2008 |
| EP | 1 914 324 | 4/2008 |
| EP | 2 000 629 | 12/2008 |
| EP | 1554518 | 1/2009 |
| EP | 2 028 284 | 2/2009 |
| EP | 2 133 442 | 12/2009 |
| EP | 2 216 576 | 8/2010 |
| EP | 2 239 343 | 10/2010 |
| FR | 1 149 513 A | 12/1957 |
| FR | 2 704 042 A | 10/1994 |
| FR | 2 848 282 A1 | 6/2004 |
| FR | 2855587 | 12/2004 |
| GB | 498 472 | 1/1939 |
| GB | 1 398 214 | 6/1973 |
| GB | 1 428 433 | 3/1976 |
| GB | 2 104 919 A | 3/1983 |
| GB | 2 234 308 A | 1/1991 |
| GB | 2 276 647 | 10/1994 |
| GB | 2 388 169 A | 11/2003 |
| JP | 58-187684 | 12/1983 |
| JP | 60-086209 | 5/1985 |
| JP | S60 116796 A | 6/1985 |
| JP | 60-215719 | 10/1985 |
| JP | 36025719 | 10/1985 |
| JP | S61-103061 | 5/1986 |
| JP | 61270355 | 11/1986 |
| JP | 63004046 A2 | 1/1988 |
| JP | 63004047 A2 | 1/1988 |
| JP | 63230847 A2 | 9/1988 |
| JP | 63230851 A2 | 9/1988 |
| JP | 01-242761 A | 9/1989 |
| JP | 01 259124 A2 | 10/1989 |
| JP | 01 259125 A2 | 10/1989 |
| JP | 01 283322 A2 | 11/1989 |
| JP | 05-098350 | 12/1990 |
| JP | 403006329 A | 1/1991 |
| JP | 04 021718 A2 | 1/1992 |
| JP | 04 107214 | 4/1992 |
| JP | 04 231414 A2 | 8/1992 |
| JP | 05 287381 A2 | 11/1993 |
| JP | H06-042645 | 2/1994 |
| JP | 06-093339 | 4/1994 |
| JP | 06 172859 A2 | 6/1994 |
| JP | 06-220536 | 8/1994 |
| JP | 07-003330 | 1/1995 |
| JP | 07 041856 A2 | 2/1995 |
| JP | 07-139666 | 5/1995 |
| JP | 07 197125 A2 | 8/1995 |
| JP | 08 311551 | 11/1996 |
| JP | 09 067624 A2 | 3/1997 |
| JP | 09-235617 | 9/1997 |
| JP | 2704042 | 10/1997 |
| JP | 10 140250 | 5/1998 |
| JP | 10176239 | 6/1998 |
| JP | 10 280037 A | 10/1998 |
| JP | 11 050148 A | 2/1999 |
| JP | 11140580 | 5/1999 |
| JP | 11229079 | 8/1999 |
| JP | 2000-063940 | 2/2000 |
| JP | 2000-178645 | 6/2000 |
| JP | 2000-248337 A | 9/2000 |
| JP | 2000-313919 A2 | 11/2000 |
| JP | 2001-131698 | 5/2001 |
| JP | 2001-131698 A | 5/2001 |
| JP | 2001-164338 | 6/2001 |
| JP | 2001-172739 A2 | 6/2001 |
| JP | 2001-271134 | 10/2001 |
| JP | 2002-096105 A2 | 4/2002 |
| JP | 2002-130554 | 5/2002 |
| JP | 2004-011009 | 1/2004 |
| JP | 2007-031769 | 7/2005 |
| JP | 60 174822 | 9/2005 |
| KR | 0245031 | 3/2000 |
| KZ | 1418 B | 12/1994 |
| KZ | 2506 B | 9/1995 |
| KZ | 2673 B | 12/1995 |
| UA | 51138 A | 11/2002 |
| WO | WO 84/02947 | 8/1984 |
| WO | WO 94/29627 | 12/1994 |
| WO | WO 96/22396 | 7/1996 |
| WO | WO 00/06931 | 2/2000 |
| WO | WO 00/70107 | 11/2000 |
| WO | WO 01/75345 | 10/2001 |
| WO | WO 01/88210 | 11/2001 |
| WO | WO 02/29290 | 4/2002 |
| WO | WO 02/35128 | 5/2002 |
| WO | WO 02/068854 | 9/2002 |
| WO | WO 02/086369 | 10/2002 |
| WO | WO 02/093045 | 11/2002 |
| WO | WO 03/033856 | 4/2003 |
| WO | WO 03/048623 | 6/2003 |
| WO | WO 03/087646 | 10/2003 |
| WO | WO 2004/023020 | 3/2004 |
| WO | WO 2004/031420 | 4/2004 |
| WO | WO 2004/033951 | 4/2004 |
| WO | WO 2004/053376 | 6/2004 |
| WO | WO 2004/097059 A1 | 11/2004 |
| WO | WO 2004/109173 | 12/2004 |
| WO | WO 2006/009142 | 1/2006 |
| WO | WO 2006/087361 | 4/2006 |
| WO | WO 2006/078768 | 7/2006 |
| WO | WO 2007/002576 | 1/2007 |
| WO | WO 2007/017082 | 2/2007 |
| WO | WO 2007/017161 | 2/2007 |
| WO | WO 2007/023806 | 3/2007 |

(56) References Cited

FOREIGN PATENT DOCUMENTS

| WO | WO 2007/028443 | | 3/2007 |
|---|---|---|---|
| WO | WO 2007/034063 | | 3/2007 |
| WO | WO 2007/063079 | | 6/2007 |
| WO | WO 2008/003000 | | 1/2008 |
| WO | WO 2008/007737 | | 1/2008 |
| WO | WO 2008/090411 | | 7/2008 |
| WO | WO 2008/110494 | | 9/2008 |
| WO | WO 2008/127084 A2 | | 10/2008 |
| WO | WO 2009/000851 | | 12/2008 |
| WO | WO 2009/000766 | | 1/2009 |
| WO | WO 2009/010507 | | 1/2009 |
| WO | WO 2009/027308 | | 3/2009 |
| WO | WO 2009/027309 | | 3/2009 |
| WO | WO 2009/044297 | | 4/2009 |
| WO | WO 2009/065432 | | 5/2009 |
| WO | WO 2009/106623 | | 9/2009 |
| WO | WO 2010/061882 | | 6/2010 |
| WO | WO 2010/122431 | | 10/2010 |
| WO | WO 2011/152240 | A1 * | 12/2011 |
| WO | WO 2013/007729 | | 1/2013 |

OTHER PUBLICATIONS

"Seamless Steel Tubes for Pressure Purposes—Technical Delivery Conditions—Part 2: Non-alloy and Alloy Steel Tubes with Specified Elevated Temperature Properties" British Standard BS EN 10216-2:2002+A2:2007:E:1-45, published Aug. 2007.
"Seamless Steel Tubes for Pressure Purposes—Technical Delivery Conditions—Part 3: Alloy Fine Grain Steel Tubes" British Standard BS EN 10216-3:2002 +A1:2004 E:1-34, published Mar. 2004.
"Seamless Steel Tubes for Pressure Purposes—Technical Delivery Conditions—Part 4: Non-alloy and Alloy Steel Tubes with Specified Low Temperature Properties" British Standard BS EN 10216-4:2002 + A1:2004 E:1-30, published Mar. 2004.
Aggarwal, R. K., et al.: "Qualification of Solutions for Improving Fatigue Life at SCR Touch Down Zone", Deep Offshore Technology Conference, Nov. 8-10, 2005, Vitoria, Espirito Santo, Brazil, in 12 pages.
Anelli, E., D. Colleluori, M. Pontremoli, G. Cumino, A. Izquierdo, H. Quintanilla, "Metallurgical design of advanced heavy wall seamless pipes for deep-water applications", 4th International Conference on Pipeline Technology, May 9 to 13, 2004, Ostend, Belgium.
Asahi, et al., Development of Ultra-high-strength Linepipe, X120, Nippon Steel Technical Report, Jul. 2004, Issue 90, pp. 82-87.
ASM Handbook, Mechanical Tubing and Cold Finishing, Metals Handbook Desk Edition, (2000), 5 pages.
Bai, M., D. Liu, Y. Lou, X. Mao, L. Li, X. Huo, "Effects of Ti addition on low carbon hot strips produced by CSP process", Journal of University of Science and Technology Beijing, 2006, vol. 13, N° 3, p. 230.
Beretta, Stefano et al., "Fatigue Assessment of Tubular Automotive Components in Presence of Inhomogeneities", Proceedings of IMECE2004, ASME International Mechanical Engineering Congress, Nov. 13-19, 2004, pp. 1-8.
Berner, Robert A., "Tetragonal Iron Sulfide", Science, Aug. 31, 1962, vol. 137, Issue 3531, pp. 669.
Berstein et al ., "The Role of Traps in the Microstructural Control of Hydrogen Embrittlement of Steels" Hydrogen Degradation of Ferrous Alloys, Ed. T. Oriani, J. Hirth, and M. Smialowski, Noyes Publications, 1988, pp. 641-685.
Boulegue, Jacques, "Equilibria in a sulfide rich water from Enghien-les-Bains, France", Geochimica et Cosmochimica Acta, Pergamom Press, 1977, vol. 41, pp. 1751-1758, Great Britan.
Bruzzoni et al., "Study of Hydrogen Permeation Through Passive Films on Iron Using Electrochemical Impedance Spectroscopy", PhD Thesis, 2003, Universidad Nacional del Comahue de Buenos Aires, Argentina.
Cancio et al., "Characterization of microalloy precipitates in the austenitic range of high strength low alloy steels", Steel Research, 2002, vol. 73, pp. 340-346.
Carboni, A., A. Pigani, G. Megahed, S. Paul, "Casting and rolling of API X 70 grades for artic application in a thin slab rolling plant", Stahl u Eisen, 2008, N° 1, p. 131-134.
Chang, L.C., "Microstructures and reaction kinetics of bainite transformation in Si-rich steels," XP0024874, Materials Science and Engineering, vol. 368, No. 1-2, Mar. 15, 2004, pp. 175-182, Abstract, Table 1.
Clark, A. Horrell, "Some Comments on the Composition and Stability Relations of Mackinawite", Neues Jahrbuch fur Mineralogie, 1966, vol. 5, pp. 300-304, London, England.
Craig, Bruce D., "Effect of Copper on the Protectiveness of Iron Sulfide Films", Corrosion, National Association of Corrosion Engineers, 1984, vol. 40, Issue 9, pp. 471-474.
D.O.T. 178.68 Spec. 39, pp. 831-840, Non reusable (non refillable) cylinders, Oct. 1, 2002.
De Medicis, Rinaldo, "Cubic FeS, A Metastable Iron Sulfide", Science, American Association for The Advancement of Science, Steenbock Memorial Library, Dec. 11, 1970, vol. 170, Issue 3963, pp. 723-728.
Echaniz, G., Morales, C., Perez, T., "Advances in Corrosion Control and Materials in Oil and Gas Production" Papers from Eurocorr 97 and Eurocorr 98, 13, P. S. Jackman and L.M. Smith, Published for the European Federation of Corrosion, No. 26, European Federation of Corrosion Publications, 1999.
Fang, Hong-Sheng, et al.: "The Developing Prospect of Air-cooled Baintitic Steels", International Journal of Issi, vol. 2, No. 2, Feb. 1, 2005, pp. 9-18.
Gojic, Mirko and Kosec, Ladislav, , "The Susceptibility to the Hydrogen Embrittlement of Low Alloy Cr and CrMo Steels", ISIJ International, 1997, vol. 37, Issue 4, pp. 412-418.
Heckmann, et al., Development of low carbon Nb-Ti-B microalloyed steels for high strength large diameter linepipe, Ironmaking and Steelmaking, 2005, vol. 32, Issue 4, pp. 337-341.
Howells, et al.: "Challenges for Ultra-Deep Water Riser Systems", IIR, London, Apr. 1997, 11 pages.
Hutchings et al., "Ratio of Specimen thickness to charging area for reliable hydrogen permeation measurement", British Corrosion. Journal, 1993, vol. 28, Issue 4, pp. 309-312.
Iino et al., "Aciers pour pipe-lines resistant au cloquage et au criquage dus a l'hydrogene", Revue de Metallurgie, 1979, vol. 76, Issue 8-9, pp. 591-609.
Ikeda et al., "Influence of Environmental Conditions and Metallurgical Factors on Hydrogen Induced Cracking of Line Pipe Steel", Corrosion/80, National Association of Corrosion Engineers, 1980, vol. 8, pp. 8/1-8/18, Houston, Texas.
Izquierdo, et al.: "Qualification of Weldable X65 Grade Riser Sections with Upset Ends to Improve Fatigue Performance of Deepwater Steel Catenary Risers", Proceedings of the Eighteenth International Offshore and Polar Engineering Conference, Vancouver, BC, Canada, Jul. 6-11, 2008, p. 71.
Johnston, P. W., G.Brooks, "Effect of Al2O3 and TiO2 Additions on the Lubrication Characteristics of Mould Fluxes", Molten Slags, Fluxes and Salts '97 Conference, 1997 pp. 845-850.
Keizer, Joel, "Statistical Thermodynamics of Nonequilibrium Processes", Spinger-Verlag, 1987.
Kishi, T., H.Takeucgi, M.Yamamiya, H.Tsuboi, T.Nakano, T.Ando, "Mold Powder Technology for Continuous Casting of Ti-Stabilized Stainless Steels", Nippon Steel Technical Report, No. 34, Jul. 1987, pp. 11-19.
Korolev, D. F., "The Role Role of Iron Sulfides in the Accumulation of Molybdenum in Sedimentary Rocks of the Reduced Zone", Geochemistry, 1958, vol. 4, pp. 452-463.
Lee, Sung Man and Lee, Jai Young, "The Effect of the Interface Character of TiC Particles on Hydrogen Trapping in Steel", Acta Metall., 1987, vol. 35, Issue 11, pp. 2695-2700.
Mishael, et al., "Practical Applications of Hydrogen Permeation Monitoring," Corrosion, Mar. 28-Apr. 1, 2004, Corrosion 2004, Nacional Association of Corrosion Engineers, vol. Reprint No. 04476.

(56) References Cited

OTHER PUBLICATIONS

Morice et al., "Moessbauer Studies of Iron Sulphides", J. lnorg. Nucl. Chem., 1969, vol. 31, pp. 3797-3802.

Mukongo, T., P.C.Pistorius, and A.M.Garbers-Craig, "Viscosity Effect of Titanium Pickup by Mould Fluxes for Stainless Steel", Ironmaking and Steelmaking, 2004, vol. 31, No. 2, pp. 135-143.

Mullet et al., "Surface Chemistry and Structural Properties of Mackinawite Prepared by Reaction of Sulfide Ions with Metallic Iron", Geochemica et Cosmochemica Acta, 2002, vol. 66, Issue 5, pp. 829-836.

Murcowchick, James B. and Barnes, H.L., "Formation of a cubic FeS", American Mineralogist, 1986, vol. 71, pp. 1243-1246.

Nagata, M., J. Speer, D. Matlock, "Titanium nitride precipitation behavior in thin slab cast high strength low alloyed steels", Metallurgical and Materials Transactions A, 2002 ,vol. 33A, p. 3099-3110.

Nakai et al., "Development of Steels Resistant to Hydrogen Induced Cracking in Wet Hydrogen Sulfide Environment", Transactions of the ISIJ, 1979, vol. 19, pp. 401-410.

Pressure Equipment Directive 97/23/EC, May 29, 1997, downloaded from website:http://ec.europa.eu/enterprise/pressure_equipment/ped/index_en.html on Aug. 4, 2010.

Prevéy, Paul, et al., "Introduction of Residual Stresses to Enhance Fatigue Performance in the Initial Design", Proceedings of Turbo Expo 2004, Jun. 14-17, 2004, pp. 1-9.

Rickard, D.T., "The Chemistry of Iron Sulphide Formation at Low Tempuratures", Stockholm Contrib. Geol., 1969, vol. 26, pp. 67-95.

Riecke, Ernst and Bohnenkamp, Konrad, "Uber den Einfluss von Gittersoerstellen in Eisen auf die Wassersroffdiffusion", Z. Metallkde.., 1984, vol. 75, pp. 76-81.

Shanabarger, M.R. and Moorhead, R. Dale, "H2O Adsorption onto clean oxygen covered iron films", Surface Science, 1996, vol. 365, pp. 614-624.

Shoesmith, et al., "Formation of Ferrous Monosulfide Polymorphs During Corrosion of Iron by Aqueous Hydrogen Sulfide at 21 degrees C", Journal of the Electrochemical Society, 1980, vol. 127, 5, pp. 1007-1015.

Skoczylas, G., A.Dasgupta, R.Bommaraju, "Characterization of the chemical interactions during casting of High-titanium low carbon enameling steels", 1991 Steelmaking Conference Proceeding, pp. 707-717.

Smyth, D., et al.: Steel Tublar Products, Properties and Selection: Irons, Steels, and High-Performance Alloys, vol. 1, ASM Handbook, ASM International, 1990, p. 327-336.

Spry, Alan, "Metamorphic Textures", Perganom Press, 1969, New York.

Taira et al., "HIC and SSC Resistance of Line Pipes for Sour Gas Service", Nippon Kokan Technical Report, 1981, vol. 31, Issue 1-13.

Taira et al., "Study on the Evaluation of Environmental Condition of Wet Sour Gas", Corrosion 83 (Reprint. No. 156, National Association of Corrosion Engineers), 1983, pp. 156/2-156/13, Houston, Texas.

Takeno et al., "Metastable Cubic Iron Sulfide—With Special Reference to Mackinawite", American Mineralogist, 1970, vol. 55, pp. 1639-1649.

Tenaris Newsletter for Pipeline Services, Apr. 2005, p. 1-8.

Tenaris Newsletter for Pipeline Services, May 2003, p. 1-8.

Thethi, et al.: "Alternative Construction for High Pressure High Temperature Steel Catenary Risers", OPT USA, Sep. 2003, p. 1-13.

Thewlis, G., Weldability of X100 linepipe, Science and Technology of Welding and Joining, 2000, vol. 5, Issue 6, pp. 365-377.

Tivelli, M., G. Cumino, A. Izquierdo, E. Anelli, A. Di Schino, "Metallurgical Aspects of Heavy Wall—High Strength Seamless Pipes for Deep Water Applications", RioPipeline 2005, Oct. 17 to 19, 2005, Rio (Brasil), Paper n° IBP 1008_05.

Todoroki, T. Ishii, K. Mizuno, A. Hongo, "Effect of crystallization behavior of mold flux on slab surface quality of a Ti-bearing Fe—Cr—Ni super alloy cast by means of continuous casting process", Materials Science and Engineering A, 2005, vol. 413-414, p. 121-124.

Turconi, G. L.: "Improvement of resistance to SSC initiation and propagation of high strength OCTG through microstruture and precipitation control"; "Paper 01077", NACE International, Houston, TX, Mar. 16, 2001.

Vaughan, D. J. and Ridout, M.S., "Moessbauer Studies of Some Sulphide Minerals", J. Inorg Nucl. Chem., 1971, vol. 33, pp. 741-746.

Wegst, C.W., "Stahlüssel", Auflage 1989, Seite 119, 2 pages.

ASTM A213/A 213M "Standard Specification for Seamless Ferritic and Austenitic Alloy-Steel Boiler, Superheater, and Heat-Exchanger Tubes".

ASTM A182/A182M "Standard Specification for Forged or Rolled Alloy and Stainless Steel Pipe Flanges, Forged Fittings, and Valves and Parts for High-Temperature Service".

ASTM A336/A336M "Standard Specification for Alloy Steel Forgings for Pressure and High-Temperature Parts".

ASTM A355 which is related to "Seamless Ferritic Alloy-Steel Pipe for High-Temperature Service".

Chitwood, G. B., et al.: "High-Strength Coiled Tubing Expands Service Capabilities", as presented at the 24th Annual OTC in Houston, Texas, May 4-7, 1992, in 15 pages.

Davis, J.R., et al. "ASM—Speciality Handbook—Carbon and alloy steels" ASM Speciality Handbook, Carbon and Alloy Steels, 1996, pp. 12-27, XP002364757 US.

Drill Rod Joint Depth Capacity Chart, downloaded Jan. 15, 2013; http://www.boartlongyear.com/drill-rod-joint-depth-capacity-chart.

E. Anelli, et al., "Metallurgical Design of Advanced Heavy Wall Seamless pipes for Deepwater Applications", 4th International Conference on Pipeline Technology, May 9-13, 2004, Ostend, Belgium.

Echaniz, "The effect of microstructure on the KISSC of low alloy carbon steels", NACE Corrosion '98, EE. UU., Mar. 1998, pp. 22-27, San Diego.

Extrait du Catalogue N 940, 1994.

Fratini et al.: "Improving friction stir welding of blanks of different thicknesses," Materials Science and Engineering A 459 (2007).

Fritz T et al, "Characterization of electroplated nickel", Microsystem Technologies, Dec. 31, 2002, vol. 9, No. 1-2, pp. 87-91, Berlin, DE.

Gomez, G., et al.: "Air cooled bainitic steels for strong, seamless pipes—Part 1—allowy design, kinetics and microstructure", Materials Science and Technology, vol. 25, No. 12, Dec. 1, 2009.

Hollomon, J.H., et al., Time-tempered Relations in Tempering Steel. New York Meeting, pp. 223-249, 1945.

ISO. Petroleum and natural gas industries—Materials for use in H2Scontaining environments in oil and gas production. ANSI/NACE ISO, 145 pages, 2009.

Jacobs, Lucinda and Emerson, Steven, "Trace Metal Solubility in an Anoxid Fjord", Earth and Planetary Sci. Letters, Elsevier Scientific Publishing Company, 1982, vol. 60, pp. 237-252, Amsterdam, Netherlands.

Kazutoshi Ohashi et al, "Evaluation of r-value of steels using Vickers hardness test", Journal of Physics: Conference Series, Aug. 7, 2012, p. 12045, vol. 379, No. 1, Institute of Physics Publishing, Bristol, GB.

Tivelli et al., "Metakkurgical Aspects of Heavy Wall—High Strength Seamless Pipes for Deep Water Applications", RioPipeline, Oct. 17-19, 2005, Rio, Brasil.

Mechanical Tubing and Cold Finishing, Metals Handbook Desk Edition, (2000), 5 pages.

Mehling, Wilfred L.: "Hot Upset Forging," ASM Handbook vol. 14, 1998, pp. 84-95.

NACE MR0175/ISO 15156-1 Petroleum and natural gas industries—Materials for use in H2S-containing Environments in oil and gas production—Part 1: General principles for selection of cracking-resistant materials, Jun. 28, 2007.

Nandan et al.: "Recent advances in friction-stir welding—Process, weldment structure and properties," Progress in Materials Science 53 (2008) 980-1023.

(56) References Cited

OTHER PUBLICATIONS

Pollack, Herman, W., Materials Science and Metallurgy, Fourth Edition, pp. 96 and 97, 1988.
Savatori et al.: European Commssion Report, EUR 2006, EUR2207, 3 pp. STN_ABSTRACT.
Specification for Threading, Gauging and Thread Inspection of Casing, Tubing, and Line Pipe Threads, American Petroleum Institute, Specification 5B, Apr. 2008, 15th Edition (Excerpts Only).
Tenaris brochure. Coiled Tubes HS80CRA, 2 pages, 2008.
Tenaris brochure. Coiled Tubes Suggested Field Welding Procedure (GTAVV) for Coiled Tubing Grads H570, H580, H590, HS11 0, 3 pages, 2007.
Tenaris brochure. Coiled Tubing for Downhole Applications, 10 pages, 2007.

\* cited by examiner

HEAVY WALL QUENCHED AND TEMPERED SEAMLESS STEEL PIPES AND RELATED METHOD FOR MANUFACTURING SAID STEEL PIPES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure in certain embodiments relates to heavy wall seamless steel pipes having a wall thickness (WT) higher than or equal to 35 mm and lower than or equal to 80 mm, and in certain embodiments relates also to a method for manufacturing the seamless steel pipes. Said seamless steel pipes, suitable for linepipes, flowlines and risers for use in the oil and gas industry, also include pipes that are suitable for hot bending.

Description of the Related Art

Exploration of offshore oil and gas reserves in remote regions of the world is increasingly moving away from conditions where relatively traditional pipe solutions can be utilized and towards more demanding environments. These more demanding environments may incorporate a combination of very challenging factors including, for example, deepwater locations, increased pressure and temperature wells, more corrosive products, and lower design temperatures. These conditions, when added to stringent weldability and toughness criteria already associated with pipe specifications for offshore oil and gas exploration applications, place ever increasing demands on the materials and supply capability.

These demands are evident in project developments involving aggressive environment and high operating pressure. For example, major seamless linepipe manufacturers are able to manufacture pipes of grades X60, X65 and X70 according with American Petroleum Institute (API) 5L and International Organization for Standards (ISO) 3183 standards, with sulfide stress corrosion (SSC) and hydrogen induced cracking (HIC) resistance. However, the conflicting requirements of strength and toughness, combined with the need for sulfide stress corrosion (SSC) and hydrogen induced cracking (HIC) resistance (e.g., sour resistance) have been proven difficult to achieve. In particular, quenched and tempered (Q&T) seamless pipes of API 5L grade X60, X65 and X70 typically exhibit maximum hardness values, measured at 1.5-2.0 mm depth from the pipe surfaces (according to API 5L-ISO 3183), below 250 $HV_{10}$ but however above 235 $HV_{10}$, whereas now new projects require lower values to make the material more resistant to SSC and weldable. These lower maximum hardness values cannot be consistently achieved with current steel chemical compositions and processes.

In the past years, there have been several types of high-strength linepipe steels developed in the field of Q&T seamless pipes. These seamless pipes combine both strength and good girth weldability. However, these seamless pipes exhibit chemical compositions which hinder hardness reduction during tempering. Therefore, close to pipe surface, where very high cooling rates are experienced during external and internal water quenching and high hardness values are achieved after quenching due to formation of a predominant martensitic microstructure, the risk exists that, even after tempering at high temperature and long time, the maximum hardness values along the whole wall thickness of the pipe remain above 235 $HV_{10}$ and less preferably above 240 $HV_{10}$.

Moreover, in the case of hot induction bends produced from Q&T seamless pipes, it is more difficult to develop the required grade, combined with good impact toughness and low surface hardness values, while developing concurrently good HIC and SSC resistance. This problem is mainly related to the process conditions used during heat treatment of bends which are necessarily different from those of the seamless pipe. In particular, the quenching process of bends is less effective. This problem cannot be simply solved using steels with higher hardenability (i.e. higher content of chemical elements), because weldability is decreased, toughness is negatively affected, and the risk of hardness peaks is increased.

Examples of manufacturing processes and related steel pipes are disclosed in EP1918395A1, EP1876254A1 and US2013/000790A1, hereby incorporated by reference in their entirety.

EP1918395A1 discloses low carbon steels and a process of manufacturing seamless steel pipes in which, immediately after hot forming the seamless pipe, the pipe is quenched and tempered, or it is put into a holding furnace and soaked at a temperature not lower than Ac3 point, and then quenched and tempered. Therefore the process of EP1918395A1 performs an in-line treatment immediately after hot forming operations, while the pipe is still at temperatures above Ar3 (i.e. without occurring phase transformation from austenite to ferrite). Tempering includes reheating below Ac1 followed by air cooling. Such a process, carried out by using the disclosed low carbon steels, produces grain size numbers defined in the Japanese standard JIS G0551 (1998) that correspond to values of prior austenite grain size (mean lineal intercept, ASTM E112) higher than 32 µm. Disadvantageously these high values of prior austenite grain size (AGS), for these low carbon steels, mean higher steel hardenability with consequently very high hardness values obtained after quenching, whereby, also after tempering, maximum hardness values below 250 $HV_{10}$ at 1.5 mm depth from pipe surface cannot be assured. Moreover, coarse AGS leads to poor toughness as impact energy and shear area values are negatively affected by coarse grain population.

US2013/000790A1 discloses that the steel pipe is subjected, immediately after hot rolling and before quenching and tempering, to an optional reheating step S4 (FIG. 5) and/or to an accelerated water cooling step S5 with a cooling rate of at least 100° C./min and a cooling stop temperature of 550° to 450° C. in order to avoid precipitation of carbo-nitrides. After this accelerated-interrupted cooling the pipes have very poor grain growth inhibition. Therefore, coarse austenite grain size (AGS), higher than 25 µm, is expected in these pipes, that means higher steel hardenability with consequently maximum hardness values of 250 $HV_{10}$ or greater at 1.5 mm depth from pipe surface. Therefore, also poor SSC resistance is expected for these materials close to pipe surfaces.

EP1876254A1 also discloses a process performing an in-line treatment immediately after hot forming operations, while the pipe is still at temperatures above Ar3. Moreover the disclosed steel compositions make difficult to decrease the hardness values below 250 $HV_{10}$ and even more below or equal to 235 $HV_{10}$ after tempering.

Therefore new solutions, which are outside of the conventional pattern for (micro)-alloying additions followed so far for Q&T seamless pipes and hot induction bends, have to be found for high performance X60Q, X65Q and X70Q grade heavy wall seamless pipes, with maximum hardness lower than 235 $HV_{10}$ and very good impact toughness at low temperature ($\leq -60°$ C.).

SUMMARY

It is an object of certain embodiments of the present disclosure to make a quenched and tempered seamless steel pipe which offers a combination of consistently low maximum hardness values also close to external and internal pipe surfaces, excellent low temperature toughness and corrosion resistance (sour service, H2S environment), and good weldability.

It is a further object of certain embodiments of the present disclosure to provide a manufacturing process of the aforesaid seamless steel pipe.

One embodiment of the present disclosure thus proposes to reach the aforesaid objects by making a seamless quenched and tempered steel pipe which has a yield strength from 415 MPa to 635 MPa and a wall thickness (WT) higher than or equal to 35 mm and lower than or equal to 80 mm, wherein the steel pipe has a chemical composition comprising or consisting of 0.050-0.085 wt % C, 0.80-1.65 wt % Mn, 0.10-0.45 wt % Si, 0.10-0.70 wt % Cr, 0.08-0.45 wt % Ni, 0.08-0.40 wt % Mo, 0.015-0.040 wt % Al, 0.0008-0.0050 wt % Ca, 0.0030-0.0090 wt % N, 0.000-0.040 wt % Nb, 0.000-0.020 wt % Ti, 0.000-0.030 wt % Zr, 0.000-0.030 wt % Ta, 0.000-0.010 wt % V, 0.00-0.25 wt % Cu, 0.000-0.003 wt % S, 0.000-0.015 wt % P, 0.0000-0.0005 wt % B, and Fe (for example, the balance being iron), wherein $CE_{IIW}$=C+Mn/6+(Cr+Mo+V)/5+(Cu+Ni)/15) is in the range of 0.36% to 0.43%, wherein, defining a first parameter P1=50×C+Cr+10×Mo+70×V, the chemical composition satisfies a first condition 4.2≤P1≤8.0, wherein the quenched and tempered steel pipe has, at mid thickness, a microstructure comprising or consisting of, in volume percentage, tempered bainite greater than or equal to 50% and ferrite ($V_F$) lower than or equal to 50%, wherein the quenched and tempered steel pipe has, at a distance up to 2 mm starting from outer and inner surfaces of the steel pipe, a microstructure comprising or consisting of, in volume percentage, tempered martensite lower than 70% and tempered bainite higher than 30%, wherein the microstructure of the quenched and tempered steel pipe has an average prior austenite grain size, measured by ASTM Standard E112, smaller than 25 μm, and wherein the maximum hardness values, measured at 1.5-2.0 mm depth from the outer and inner surfaces, are not higher than 235 $HV_{10}$.

Certain embodiments of the present disclosure relate to a manufacturing process of the aforesaid seamless steel pipe in which there are provided the following steps:
  hot forming a seamless steel pipe having a chemical composition as described above and a wall thickness (WT) higher than or equal to 35 mm and lower than or equal to 80 mm;
  cooling in air the seamless steel pipe up to reach room temperature;
  heating the seamless steel pipe, with a first heating rate between 0.1° C./s and 10° C./s, to an austenitizing temperature above the Ac3 transformation point, in a range between 880° C. and 980° C., and providing a soaking time between 180 s and 5400 s;
  quenching the seamless steel pipe, by means an external and internal cooling, with a cooling rate greater than 6° C./s and up to 30° C./s at mid thickness of the pipe, and with a cooling rate of 100-200° C./s in proximity of the outer and inner surfaces of the pipe;
  heating the seamless steel pipe, with a second heating rate between 0.1° C./s and 10° C./s, to a tempering temperature comprised in a predetermined range, and providing a holding time at said tempering temperature between 600s and 7200s;
wherein said predetermined range is calculated with a tolerance of ±20° C. using the following equation $$T(° C.) = \frac{1000 \times (-1.42 + C + 1.84 \times Mn + 4.6 \times Cr + 11.6 \times Mo + 25 \times V)}{a - 3.8 \times C + 1.5 \times Mn + 4.3 \times Cr + 10.7 \times Mo + 20 \times V} - 273.15$$

where a is a parameter having a value equal to −0.07, 0.16 or 0.40 if the grade to be achieved is X60Q, X65Q or X70Q, respectively. The seamless quenched and tempered (Q&T) steel pipes of the disclosure are suitable for line pipes, flowlines and risers of grades X60Q, X65Q and X70Q, and preferably have an outside diameter (OD) between 6" (152 mm) and 28" (711 mm).

After the manufacture of the heavy wall seamless pipes, in certain embodiments the same can be subjected to bending operations and heat treatments to obtain bends of grades X60Q and X65Q with low maximum hardness and improved toughness at low temperature. Said bends have a yield strength from 415 to 600 MPa; maximum hardness values, measured at 1.5-2.0 mm depth from the surface, below or equal to 235 HV10; good impact toughness at low temperature (minimum impact energy of 150 J for transverse CVN tests performed on standard size specimens at −40° C.), while concurrently possessing good Hydrogen induced cracking (HIC) and sulfide stress corrosion cracking (SSC) resistance.

Defining the parameter P1=50×C+Cr+10×Mo+70×V, the steel pipe of certain embodiments of the disclosure can meet the requirements of low maximum hardness (also in the part of wall thickness proximal to the outside and inside surfaces of the pipe), specified minimum yield strength (SMYS), toughness and corrosion resistance by satisfying the following condition:
P1=50×C+Cr+10×Mo+70×V≤8.0, preferably P1≤7.5, where the symbols for the chemical elements represent the value of the weight percentage (wt %).

Moreover, defining the parameter P2=10×C+Mn+Cr+4×Mo+16×V, some embodiments of the disclosure can obtain adequate tensile properties at mid thickness if the parameter P2 satisfies the conditions summarized the following table:

| | Minimum Yield strength required | | |
| --- | --- | --- | --- |
| | 415 Mpa | 450 MPa | 485 MPa |
| P2 = 10 × C + Mn + Cr + 4 × Mo + 16 × V | ≥2.3 | ≥2.7 | ≥3.5 |

The symbol "x" in the parameters P1 and P2 and in the formula of the carbon equivalent CEPcm is a multiplication sign. In the parameters P1 and P2 the symbols for the chemical elements represent the value of the weight percentage (wt %).

Some embodiments of steel pipes manufactured according to the present disclosure exhibit:

Yield strength, YS: 415 MPa (60.2 ksi) minimum and 635 MPa (92.1 ksi) maximum.

Ultimate Tensile Strength, UTS: 520 MPa (75.4 ksi) minimum and 760 MPa (110.2 ksi) maximum.

Elongation, not less than 18%.

YS/UTS ratio not higher than 0.90.

Maximum hardness (measured at 1.5 mm to 2.0 mm depth from the pipe surface) not higher than 235 $HV_{10}$, preferably not higher than 230 $HV_{10}$, and more preferably not higher than 225 $HV_{10}$.

Minimum impact energy of 200 J/150 J (average/individual) and minimum 85% of average shear area for both longitudinal and transverse Charpy V-notch (CVN) tests performed on standard size specimens at −40° C. according with standard ASTM A 370.

Ductile-Brittle Transformation Temperature (ASTM E23) less than or equal to about −60° C.

hydrogen induced cracking (HIC) resistance, assessed according with NACE Standard TM0284-2003 Item No. 21215, using NACE solution A and test duration 96 hours, with the following HIC parameters (average on three sections of three specimens):

Crack Length Ratio, CLR≤10%

Crack Thickness Ratio, CTR≤3%

Crack Sensitivity Ratio, CSR≤0.5%.

sulfide stress corrosion (SSC) cracking resistance, assessed in accordance with ASTM G39, using NACE TM0177 test solution A and a duration of 720 hours, with no failure at 90% of the actual yield stress (AYS).

All these characteristics were achieved through a tailored metallurgical design of pipes by means of laboratory tests and industrial trials. The results show that the manufacture of Q&T seamless pipes and bends with maximum hardness not higher than 235 HV10, preferably not higher than 230 HV10, and more preferably not higher than 225 HV10, is possible at least within a determined dimensional range: outside diameter (OD) varying from 6" (152 mm) to 28" (711 mm), and wall thickness (WT) from 35 mm to 80 mm.

In particular, the steel pipes of certain embodiments the disclosure can have maximum hardness, measured at 1.5-2.0 mm depth from the internal and external surfaces, not higher than 235 HV10 for the grade X70Q, not higher than 230 HV10 for the grade X65Q, and not higher than 225 HV10 for the grade X60Q.

In one embodiment, a seamless quenched and tempered steel pipe comprises a yield strength from 415 MPa to 635 MPa and a wall thickness (WT) higher than or equal to 35 mm and lower than or equal to 80 mm, wherein the steel pipe has a chemical composition comprising:

Fe;
0.050-0.085 wt % C;
0.80-1.65 wt % Mn;
0.10-0.45 wt % Si;
0.10-0.70 wt % Cr;
0.08-0.45 wt % Ni;
0.08-0.40 wt % Mo;
0.015-0.040 wt % Al;
0.0008-0.0050 wt % Ca;
0.0030-0.0090 wt % N;
0.000-0.040 wt % Nb;
0.000-0.020 wt % Ti;
0.000-0.030 wt % Zr;
0.000-0.030 wt % Ta;
0.000-0.010 wt % V;
0.00-0.25 wt % Cu;
0.000-0.003 wt % S;
0.000-0.015 wt % P;
0.0000-0.0005 wt % B;

wherein $CE_{IIW}=C+Mn/6+(Cr+Mo+V)/5+(Cu+Ni)/15$ is in the range of 0.36% to 0.43%; wherein, defining a first parameter $P1=50\times C+Cr+10\times Mo+70\times V$, the chemical composition satisfies a first condition 4.2≤P1≤8.0, wherein the quenched and tempered steel pipe has, at mid thickness, a microstructure comprising, in volume percentage, tempered bainite greater than or equal to 50% and ferrite ($V_F$) lower than or equal to 50%, wherein the quenched and tempered steel pipe has, at a distance up to 2 mm starting from outer and inner surfaces of the steel pipe, a microstructure comprising, in volume percentage, tempered martensite lower than 70% and tempered bainite higher than 30%, wherein the microstructure of the quenched and tempered steel pipe has an average prior austenite grain size, measured by ASTM Standard E112, smaller than 25 μm, and wherein the maximum hardness values, measured at 1.5-2.0 mm depth from the outer and inner surfaces, are not higher than 235 $HV_{10}$.

In some embodiments, at a distance up to 2 mm starting from outer and inner surfaces of the steel pipe, the microstructure can comprise tempered martensite lower than 40% and tempered bainite higher than 60%, preferably of tempered martensite lower than 20% and tempered bainite higher than 80%. In some embodiments, at a distance up to 2 mm starting from outer and inner surfaces of the steel pipe, the microstructure only comprises tempered bainite. In some embodiments, at mid thickness, the microstructure can comprise tempered bainite greater than or equal to 60% and ferrite ($V_F$) lower than or equal to 40%. In some embodiments, at mid thickness, the microstructure can comprise tempered bainite greater than or equal to 80% and ferrite ($V_F$) lower than or equal to 20%. In some embodiments, at mid thickness, the microstructure can comprise ferrite ($V_F$) lower than or equal to 50% for a pipe of grade X60, ferrite ($V_F$) lower than or equal to 40% for a pipe of grade X65, ferrite ($V_F$) lower than or equal to 20% for a pipe of grade X70.

In some embodiments, the chemical composition can define a second parameter $P2=10\times C+Mn+Cr+4\times Mo+16\times V$, the chemical composition can satisfy a second condition P2≥2.3. In some embodiments, the second parameter P2 can satisfy the following conditions:

P2≥2.3 in order to meet the minimum yield strength required by the grade X60Q (415 MPa);

P2≥2.7 in order to meet the minimum yield strength required by the grade X65Q (450 MPa); and P2≥3.5 in order to meet the minimum yield strength required by the grade X70Q (485 MPa).

In some embodiments, the second parameter P2 can be lower than or equal to 4.0.

In some embodiments, $CE_{PCM}=C+Si/30+Mn/20+Cr/20+Cu/20+Ni/60+Mo/15+V/10+5\times B$ can be in the range of 0.17% to 0.22%.

In some embodiments, the chemical composition can comprise:

Fe;
0.050-0.085 wt % C;
0.95-1.30 wt % Mn;
0.10-0.35 wt % Si;
0.20-0.50 wt % Cr;
0.15-0.40 wt % Ni;
0.15-0.40 wt % Mo;
0.000-0.010 wt % V;
0.020-0.040 wt % Al;

0.0008-0.0030 wt % Ca;
0.020-0.040 wt % Nb;
0.000-0.015 wt % Ti;
0.0030-0.0070 wt % N;
0.00-0.20 wt % Cu;
0.0000-0.0020 wt % S;
0.000-0.015 wt % P;
0.0000-0.0005 wt % B;
0.000-0.015 wt % Zr;
0.000-0.015 wt % Ta.

In some embodiments, the chemical composition can comprise:
Fe;
0.060-0.080 wt % C;
1.00-1.20 wt % Mn;
0.10-0.30 wt % Si;
0.30-0.40 wt % Cr;
0.25-0.35 wt % Ni;
0.30-0.35 wt % Mo;
0.000-0.010 wt % V;
0.020-0.030 wt % Al;
0.0015-0.0030 wt % Ca;
0.020-0.030 wt % Nb;
0.000-0.015 wt % Ti;
0.0030-0.0060 wt % N;
0.00-0.15 wt % Cu;
0.0000-0.0010 wt % S;
0.000-0.011 wt % P;
0.0000-0.0005 wt % B;
0.000-0.010 wt % Zr,
0.000-0.010 wt % Ta.

In some embodiments, the chemical composition can comprise:
Fe;
0.060-0.085 wt % C;
0.95-1.30 wt % Mn;
0.10-0.35 wt % Si;
0.20-0.40 wt % Cr;
0.25-0.40 wt % Ni;
0.25-0.35 wt % Mo;
0.000-0.010 wt % V;
0.020-0.040 wt % Al;
0.0008-0.0030 wt % Ca;
0.020-0.040 wt % Nb;
0.000-0.015 wt % Ti;
0.0030-0.0070 wt % N;
0.00-0.20 wt % Cu;
0.0000-0.0020 wt % S;
0.000-0.015 wt % P;
0.0000-0.0005 wt % B;
0.000-0.015 wt % Zr;
0.000-0.015 wt % Ta;
and can satisfy the following additional conditions:
  $P1=50 \times C+Cr+10 \times Mo+70 \times V$ in the range from 6.3 to 8.0;
  $P2=10 \times C+Mn+Cr+4 \times Mo+16 \times V$ in the range from 2.75 to 3.8;
  $CE_{IIW}=C+Mn/6+(Cr+Mo+V)/5+(Cu+Ni)/15$ in the range from 0.38% to 0.43%;
  $CE_{PCM}=C+Si/30+Mn/20+Cr/20+Cu/20+Ni/60+Mo/15+V/10+5 \times B$ in the range from 0.17% to 0.21%.

In some embodiments, the chemical composition can comprise:
Fe;
0.050-0.080 wt % C;
0.95-1.20 wt % Mn;
0.10-0.35 wt % Si;
0.10-0.30 wt % Cr;
0.15-0.35 wt % Ni;
0.15-0.30 wt % Mo;
0.000-0.010 wt % V;
0.020-0.040 wt % Al;
0.0008-0.0030 wt % Ca;
0.020-0.040 wt % Nb;
0.000-0.015 wt % Ti;
0.0030-0.0070 wt % N;
0.00-0.20 wt % Cu;
0.0000-0.0020 wt % S;
0.000-0.015 wt % P;
0.0000-0.0005 wt % B;
0.000-0.015 wt % Zr;
0.000-0.015 wt % Ta;
and can satisfy the following additional conditions:
  $P1=50 \times C+Cr+10 \times Mo+70 \times V$ in the range from 4.2 to 7.5;
  $P2=10 \times C+Mn+Cr+4 \times Mo+16 \times V$ in the range from 2.31 to 3.66
  $CE_{IIW}=C+Mn/6+(Cr+Mo+V)/5+(Cu+Ni)/15$ in the range from 0.36% to 0.41%;
  $CE_{PCM}=C+Si/30+Mn/20+Cr/20+Cu/20+Ni/60+Mo/15+V/10+5 \times B$ in the range from 0.16% to 0.21%.

Also disclosed herein are embodiments of a method for manufacturing a seamless quenched and tempered steel pipe which can comprise hot forming a seamless steel pipe having a wall thickness (WT) higher than or equal to 35 mm and lower than or equal to 80 mm and a chemical composition comprising:
Fe;
0.050-0.085 wt % C;
0.80-1.65 wt % Mn;
0.10-0.45 wt % Si;
0.10-0.70 wt % Cr;
0.08-0.45 wt % Ni;
0.08-0.40 wt % Mo;
0.015-0.040 wt % Al;
0.0008-0.0050 wt % Ca;
0.0030-0.0090 wt % N;
0.000-0.040 wt % Nb;
0.000-0.020 wt % Ti;
0.000-0.030 wt % Zr;
0.000-0.030 wt % Ta;
0.000-0.010 wt % V;
0.00-0.25 wt % Cu;
0.000-0.003 wt % S;
0.000-0.015 wt % P;
0.0000-0.0005 wt % B;
cooling in air the seamless steel pipe up to reach room temperature;
heating the seamless steel pipe, with a first heating rate between 0.1° C./s and 10° C./s, to an austenitizing temperature above the Ac3 transformation point, in a range between 880° C. and 980° C., and providing a soaking time between 180s and 5400s;
quenching the seamless steel pipe, by means an external and internal cooling, with a cooling rate greater than 6° C./s and up to 30° C./s at mid thickness of the pipe, and with a cooling rate of 100-200° C./s in proximity of the outer and inner surfaces of the pipe;
heating the seamless steel pipe, with a second heating rate between 0.1° C./s and 10° C./s, to a tempering temperature comprised in a predetermined range, and providing a holding time at said tempering temperature between 600s and 7200s;

wherein said predetermined range is calculated with a tolerance of ±20° C. using the following equation:

$$T(° C.) = \frac{1000 \times (-1.42 + C + 1.84 \times Mn + 4.6 \times Cr + 11.6 \times Mo + 25 \times V)}{a - 3.8 \times C + 1.5 \times Mn + 4.3 \times Cr + 10.7 \times Mo + 20 \times V} - 273.15$$

where a is a parameter having a value equal to −0.07, 0.16 or 0.40 if the grade to be achieved is X60Q, X65Q or X70Q, respectively; and wherein the final steel pipe has yield strength from 415 MPa to 635 MPa.

Also disclosed herein is a pipe bend which can have a composition as disclosed above and maximum hardness values, measured at 1.5 mm to 2 mm depth from the surface, not higher than 235 $HV_{10}$. In some embodiments, the pipe bend can have maximum hardness values, measured at 1.5 mm to 2 mm depth from the surface, not higher than 230 $HV_{10}$.

With respect to the above described compositions or as described else wherein this specification, where compositions are described as "comprising" certain elements, the chemical composition may alternatively "consist of" or "consist essentially of" the listed elements. If the chemical composition "consists of" or "consists essentially of" certain elements, the chemical composition can have a balance of Fe with or without inevitable impurities.

Following is an illustrative listing of some additional embodiments within the scope of this disclosure. These embodiments are examples only and are not intended to be limiting. Although there may be some embodiments within the scope of this disclosure that are not expressly recited below or elsewhere herein, the present disclosure contemplates and includes all embodiments within the scope of what this disclosure shows and describes. Further, this disclosure contemplates and includes embodiments comprising any combination of any structure, material, step, or other feature disclosed anywhere herein with any other structure, material, step, or other feature disclosed anywhere herein.

Embodiment 1: A seamless quenched and tempered steel pipe, having a yield strength from 415 MPa to 635 MPa and a wall thickness (WT) higher than or equal to 35 mm and lower than or equal to 80 mm, wherein the steel pipe has a chemical composition consisting of 0.050-0.085 wt % C, 0.80-1.65 wt % Mn, 0.10-0.45 wt % Si, 0.10-0.70 wt % Cr, 0.08-0.45 wt % Ni, 0.08-0.40 wt % Mo, 0.015-0.040 wt % Al, 0.0008-0.0050 wt % Ca, 0.0030-0.0090 wt % N, 0.000-0.040 wt % Nb, 0.000-0.020 wt % Ti, 0.000-0.030 wt % Zr, 0.000-0.030 wt % Ta, 0.000-0.010 wt % V, 0.00-0.25 wt % Cu, 0.000-0.003 wt % S, 0.000-0.015 wt % P, 0.0000-0.0005 wt % B based on the composition weight, the remaining being iron; wherein $CE_{IIW}$=C+Mn/6+(Cr+Mo+V)/5+(Cu+Ni)/15) is in the range of 0.36% to 0.43%, wherein, defining a first parameter P1=50×C+Cr+10×Mo+70×V, the chemical composition satisfies a first condition 4.2≤P1≤8.0; wherein the quenched and tempered steel pipe has, at mid thickness, a microstructure consisting of, in volume percentage, tempered bainite greater than or equal to 50% and ferrite ($V_F$) lower than or equal to 50%, wherein the quenched and tempered steel pipe has, at a distance up to 2 mm starting from outer and inner surfaces of the steel pipe, a microstructure consisting of, in volume percentage, tempered martensite lower than 70% and tempered bainite higher than 30%, wherein the microstructure of the quenched and tempered steel pipe has an average prior austenite grain size, measured by ASTM Standard E112, smaller than 25 µm, and wherein the maximum hardness values, measured at 1.5-2.0 mm depth from the outer and inner surfaces, are not higher than 235 $HV_{10}$.

Embodiment 2: A seamless quenched and tempered steel pipe according to embodiment 1, wherein, at a distance up to 2 mm starting from outer and inner surfaces of the steel pipe, the microstructure consists of tempered martensite lower than 40% and tempered bainite higher than 60%, preferably of tempered martensite lower than 20% and tempered bainite higher than 80%.

Embodiment 3: A seamless quenched and tempered steel pipe according to embodiment 2, wherein, at a distance up to 2 mm starting from outer and inner surfaces of the steel pipe, the microstructure only consists of tempered bainite.

Embodiment 4: A seamless quenched and tempered steel pipe according to any one of the preceding embodiments, wherein, at mid thickness, the microstructure comprises tempered bainite greater than or equal to 60% and ferrite ($V_F$) lower than or equal to 40%, preferably tempered bainite greater than or equal to 80% and ferrite ($V_F$) lower than or equal to 20%.

Embodiment 5: A seamless quenched and tempered steel pipe according to embodiment 1, wherein, at mid thickness, the microstructure comprises ferrite ($V_F$) lower than or equal to 50% for a pipe of grade X60, ferrite ($V_F$) lower than or equal to 40% for a pipe of grade X65, ferrite ($V_F$) lower than or equal to 20% for a pipe of grade X70.

Embodiment 6: A seamless quenched and tempered steel pipe according to any one of the preceding embodiments, wherein, defining a second parameter P2=10×C+Mn+Cr+4×Mo+16×V, the chemical composition satisfies a second condition P2≥2.3.

Embodiment 7: A seamless quenched and tempered steel pipe according to embodiment 6, wherein the second parameter P2 satisfies the following conditions: P2≥2.3 in order to meet the minimum yield strength required by the grade X60Q (415 MPa); P2≥2.7 in order to meet the minimum yield strength required by the grade X65Q (450 MPa); P2≥3.5 in order to meet the minimum yield strength required by the grade X70Q (485 MPa).

Embodiment 8: A seamless quenched and tempered steel pipe according to embodiments 6 or 7, wherein the second parameter P2 is lower than or equal to 4.0.

Embodiment 9: A seamless quenched and tempered steel pipe according to any one of the preceding embodiments, wherein $CE_{PCM}$=C+Si/30+Mn/20+Cr/20+Cu/20+Ni/60+Mo/15+V/10+5×B is in the range of 0.17% to 0.22%.

Embodiment 10: A seamless quenched and tempered steel pipe according to any one of the preceding claims, wherein the chemical composition consists of (by weight %): 0.050-0.085 wt % C, 0.95-1.30 wt % Mn, 0.10-0.35 wt % Si, 0.20-0.50 wt % Cr, 0.15-0.40 wt % Ni, 0.15-0.40 wt % Mo, 0.000-0.010 wt % V, 0.020-0.040 wt % Al, 0.0008-0.0030 wt % Ca, 0.020-0.040 wt % Nb, 0.000-0.015 wt % Ti, 0.0030-0.0070 wt % N, 0.00-0.20 wt % Cu, 0.0000-0.0020 wt % S, 0.000-0.015 wt % P, 0.0000-0.0005 wt % B, 0.000-0.015 wt % Zr, 0.000-0.015 wt % Ta, the remaining being iron.

Embodiment 11: A seamless quenched and tempered steel pipe according to any one of the preceding claims, wherein the chemical composition consists of (by weight %): 0.060-0.080 wt % C, 1.00-1.20 wt % Mn, 0.10-0.30 wt % Si, 0.30-0.40 wt % Cr, 0.25-0.35 wt % Ni, 0.30-0.35 wt % Mo, 0.000-0.010 wt % V, 0.020-0.030 wt % Al, 0.0015-0.0030 wt % Ca, 0.020-0.030 wt % Nb, 0.000-0.015 wt % Ti, 0.0030-0.0060 wt % N, 0.00-0.15 wt % Cu, 0.0000-0.0010 wt % S, 0.000-0.011 wt % P, 0.0000-0.0005 wt % B, 0.000-0.010 wt % Zr, 0.000-0.010 wt % Ta, the remaining being iron.

Embodiment 12: A seamless quenched and tempered steel pipe according to any one of claims from 1 to 9, wherein the chemical composition consists of (by weight %): 0.060-0.085 wt % C, 0.95-1.30 wt % Mn, 0.10-0.35 wt % Si, 0.20-0.40 wt % Cr, 0.25-0.40 wt % Ni, 0.25-0.35 wt % Mo, 0.000-0.010 wt % V, 0.020-0.040 wt % Al, 0.0008-0.0030 wt % Ca, 0.020-0.040 wt % Nb, 0.000-0.015 wt % Ti, 0.0030-0.0070 wt % N, 0.00-0.20 wt % Cu, 0.0000-0.0020 wt % S, 0.000-0.015 wt % P, 0.0000-0.0005 wt % B, 0.000-0.015 wt % Zr, 0.000-0.015 wt % Ta, the remaining being iron; and satisfies the following additional conditions P1=50×C+Cr+10×Mo+70×V in the range from 6.3 to 8.0; P2=10×C+Mn+Cr+4×Mo+16×V in the range from 2.75 to 3.8; $CE_{IIW}$=C+Mn/6+(Cr+Mo+V)/5+(Cu+Ni)/15 in the range from 0.38% to 0.43%; $CE_{PCM}$=C+Si/30+Mn/20+Cr/20+Cu/20+Ni/60+Mo/15+V/10+5×B in the range from 0.17% to 0.21%.

Embodiment 13: A seamless quenched and tempered steel pipe according to any one of embodiments from 1 to 9, wherein the chemical composition consists of (by weight %): 0.050-0.080 wt % C, 0.95-1.20 wt % Mn, 0.10-0.35 wt % Si, 0.10-0.30 wt % Cr, 0.15-0.35 wt % Ni, 0.15-0.30 wt % Mo, 0.000-0.010 wt % V, 0.020-0.040 wt % Al, 0.0008-0.0030 wt % Ca, 0.020-0.040 wt % Nb, 0.000-0.015 wt % Ti, 0.0030-0.0070 wt % N, 0.00-0.20 wt % Cu, 0.0000-0.0020 wt % S, 0.000-0.015 wt % P, 0.0000-0.0005 wt % B, 0.000-0.015 wt % Zr, 0.000-0.015 wt % Ta, the remaining being iron; and satisfies the following additional conditions P1=50×C+Cr+10×Mo+70×V in the range from 4.2 to 7.5; P2=10×C+Mn+Cr+4×Mo+16×V in the range from 2.31 to 3.66 $CE_{IIW}$=C+Mn/6+(Cr+Mo+V)/5+(Cu+Ni)/15 in the range from 0.36% to 0.41%; $CE_{PCM}$=C+Si/30+Mn/20+Cr/20+Cu/20+Ni/60+Mo/15+V/10+5×B in the range from 0.16% to 0.21%.

Embodiment 14: A process of manufacturing a seamless quenched and tempered steel pipe having a yield strength from 415 MPa to 635 MPa, the process consisting of the following steps:
  hot forming a seamless steel pipe having a chemical composition according to claim 1 and a wall thickness (WT) higher than or equal to 35 mm and lower than or equal to 80 mm;
  cooling in air the seamless steel pipe up to reach the room temperature;
  heating the seamless steel pipe, with a first heating rate between 0.1° C./s and 10° C./s, to an austenitizing temperature above the Ac3 transformation point, in a range between 880° C. and 980° C., and providing a soaking time between 180s and 5400s;
  quenching the seamless steel pipe, by means an external and internal cooling, with a cooling rate greater than 6° C./s and up to 30° C./s at mid thickness of the pipe, and with a cooling rate of 100-200° C./s in proximity of the outer and inner surfaces of the pipe;
  heating the seamless steel pipe, with a second heating rate between 0.1° C./s and 10° C./s, to a tempering temperature comprised in a predetermined range, and providing a holding time at said tempering temperature between 600s and 7200s;
wherein said predetermined range is calculated with a tolerance of ±20° C. using the following equation $$T(° C.) = \frac{1000 \times (-1.42 + C + 1.84 \times Mn + 4.6 \times Cr + 11.6 \times Mo + 25 \times V)}{a - 3.8 \times C + 1.5 \times Mn + 4.3 \times Cr + 10.7 \times Mo + 20 \times V} - 273.15$$

where a is a parameter having a value equal to −0.07, 0.16 or 0.40 if the grade to be achieved is X60Q, X65Q or X70Q, respectively.

Embodiment 15: A bend, obtainable by a seamless steel pipe according to embodiment 1, having maximum hardness values, measured at 1.5 mm to 2 mm depth from the surface, not higher than 235 $HV_{10}$, preferably not higher than 230 $HV_{10}$.

BRIEF DESCRIPTION OF THE DRAWINGS

Further features and advantages of certain embodiments the present disclosure will be more apparent in the light of the detailed description of seamless steel pipes and of a manufacturing process thereof, illustrated by way of non-limitative example, with the aid of the accompanying drawings.

DETAILED DESCRIPTION

Figure 1:
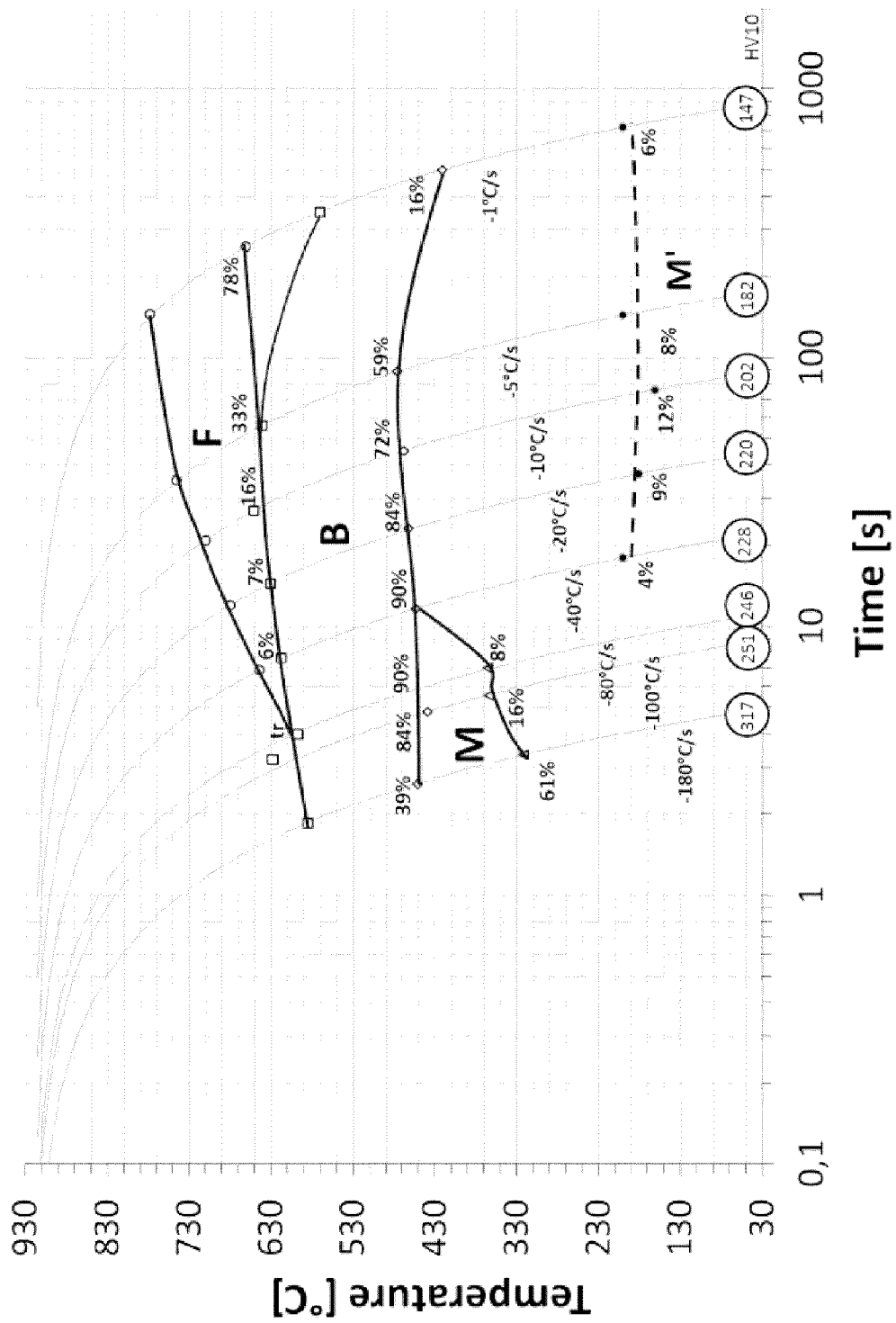
FIG. 1 illustrates a continuous cooling transformation (CCT) diagram for one embodiment of a steel according the disclosure.

The seamless steel pipe, subject of certain embodiments of the present disclosure, can be designed in order to have not only the medium hardness value along the whole wall thickness but also the maximum hardness values below or equal to 235 $HV_{10}$, preferably below or equal to 230 $HV_{10}$, and more preferably not higher than 225 $HV_{10}$, also in proximity of both internal and external surfaces of the pipe, combined with good toughness at low temperatures, resistance to sulfide stress corrosion cracking (SSC) and hydrogen induced cracking (HIC), which can enable use of the pipe in sour service environments. Said maximum hardness values have been measured at 1.5 mm to 2.0 mm depth from both the internal and external surfaces of the pipes, according to ISO 3183.

The term "pipe", as used herein, refers to a hollow, elongate member which can be straight or have bends or curves and be formed to a predetermined shape, and any additional forming required to secure the formed tubular product in its intended location. The pipe can have a substantially cylindrical outer surface and inner surface, although other shapes and cross-sections are contemplated as well.

The term "room temperature" as used herein has its ordinary meaning as known to those skilled in the art and may include temperatures within the range of about 16° C. (60° F.) to about 32° C. (90° F.).

Regarding the steel composition, the term "optional element" refers to an element that is possibly added to the chemical composition of embodiments of the steel pipes of the disclosure. Each optional element can be added to further improve the properties of the steel pipes. For example, optional elements in the steel of the seamless pipes of certain embodiments of the disclosure are: niobium (Nb), titanium (Ti), zirconium (Zr), tantalum (Ta).

The term "impurity element", instead, refers to an element not provided in the design of the steel composition in order to reach the aforesaid objects of the disclosure. However, said element may be present as impurity or traces because, depending on the manufacturing process, its presence may be unavoidable. In order to optimize the properties of the steel pipes of the disclosure, the content of each impurity element has been appropriately limited.

In particular, vanadium is an impurity element that, if present, can have a maximum value of 0.010 wt %. In seamless steel pipes of the prior art a higher vanadium content caused maximum hardness values higher than 235HV10, in particular in proximity of the pipe surfaces, even if the medium or average hardness value along the whole wall thickness was lower than 235HV10. The term "medium or average hardness" means the average value of the hardness values measured along the wall thickness of the pipe.

In addition to vanadium, further impurity elements can be: copper (Cu), sulfur (S), phosphorous (P), boron (B).

The maximum value of all impurities in the steel composition can be advantageously equal to about 0.279 wt (the sum of the maximum values of all the impurities is 0.2785 wt %).

The seamless steel pipes according to certain embodiments of the disclosure can be employed, for example, as linepipes, flowlines and risers for use in the oil and gas industry. Said pipes can have a wall thickness greater than or equal to 35 mm and less than or equal to 80 mm and preferably have, globally, a predominant microstructure of bainite, as explained later in greater detail. Said pipes can possess a minimum yield strength of at least 415 MPa (60 ksi), covering the mechanical properties corresponding to different grades: X60Q (minimum yield strength of 415 MPa=60.2 ksi), X65Q (minimum yield strength of 450 MPa=65.3 ksi), and X70Q (minimum yield strength of 485 MPa=70.3 ksi).

As discussed in detail below, through a combination of steel composition and heat treatment, a final microstructure of certain embodiments can be achieved that gives rise to selected mechanical properties of interest in heavy wall seamless pipes.

The steel composition of certain embodiments of the present disclosure can comprise low carbon (C), manganese (Mn), silicon (Si), chromium (Cr), nickel (Ni), molybdenum (Mo), aluminum (Al), nitrogen (N) and calcium (Ca). Additionally, one or more of the following elements can be optionally added: niobium (Nb), titanium (Ti), zirconium (Zr), tantalum (Ta). The remainder of the composition can comprise iron (Fe) and possible impurities. The concentration of said impurities can be reduced to as low an amount as possible. Said impurities can include vanadium (V), copper (Cu), sulfur (S), phosphorous (P), boron (B).

Hardenability of the steel, i.e. the relative ability of the steel to form bainite and martensite when quenched, has been improved through the chemical composition in certain embodiments. In particular, addition of elements such as Mo, Mn, Cr, and Ni in the ranges below described can be effective in promoting bainite formation instead of ferrite in certain embodiments. This aspect is fundamental in the case of heavy wall pipes (wall thickness greater than or equal to 35 mm) to achieve at mid-wall (or mid thickness) the yield strength after quenching and tempering.

As the process of cleavage fracture initiation is considered as composed of three stages: (I) formation of fracture origin by cementite cracking, (II) propagation of the crack in cementite into the matrix and formation of a cleavage crack, and (III) propagation of the cleavage crack across high angle grain boundaries, both a low number per unit volume of cementite particles and a high frequency of high angle boundaries (fine packets) lead to a better impact toughness at low-temperature.

Low C content can avoid the formation of an excessive number of coarse cementite particles, but can reduce hardenability and can increase transformation temperatures in some embodiments. Therefore, C decrease can be combined with proper Mn, Cr, Ni, and Mo additions to reduce transformation temperatures and maintain fine the packet size.

In some embodiments, steels were identified as having:

niobium (Nb) microaddition (0.040% max), preferably 0.015-0.040%;

carbon content from 0.050 to 0.085%, where the lower the carbon content in the steel the higher the level of other alloying elements such as Mn, Mo, Cr, and Ni.

Advantageously the combination of the chemical elements can be optimized in certain embodiments in order to maintain low the maximum hardness value and induce good weldability, maintaining the carbon equivalent $CE_{IIW}=C+Mn/6+(Cr+Mo+V)/5+(Cu+Ni)/15$) in the range from 0.36% to 0.43%. Moreover, the carbon equivalent $CE_{Pcm}$ values ($CE_{Pcm}=C+Si/30+Mn/20+Cr/20+Cu/20+Ni/60+Mo/15+V/10+5B$) can be in the range from 0.17 to 0.22. The symbols of the chemical elements for the carbon equivalents $Ce_{IIW}$ and $CE_{Pcm}$ represent the weight percentage (wt %).

Advantageously, the reduced maximum hardness values (along the whole thickness of the pipe), of minimum strength, toughness and corrosion resistance can be consistently guaranteed in certain embodiments if the parameter P1 defined by the equation 1:

$$P1=50\times C+Cr+10\times Mo+70\times V \qquad (eq.\ 1)$$

satisfies the condition P1≤8.0, preferably P1≤7.5.

Advantageously P1 can be higher than or equal to 4.2.

The steel pipes of certain embodiments of the disclosure can have a U-shaped hardness profile along the wall thickness, with the highest values at the inner and outer surfaces and the lowest values at mid-thickness.

Moreover, adequate tensile properties at mid thickness can be achieved in certain embodiments if the parameter P2 defined by equation 2, $$P2=10\times C+Mn+Cr+4\times Mo+16\times V \qquad (eq.\ 2)$$

and can satisfy the following condition P2≥2.3, and in particular:

P2≥2.3 in order to meet the minimum yield strength required by the grade X60Q (415 MPa);

P2≥2.7 in order to meet the minimum yield strength required by the grade X65Q (450 MPa);

P2≥3.5 in order to meet the minimum yield strength required by the grade X70Q (485 MPa).

Advantageously P2 can be lower than or equal to 4.0.

The symbol "×" in the equations 1 and 2 and in the formula of the carbon equivalent CEPcm is a multiplication sign. In the equations 1 and 2 the symbols for the chemical elements represent the value of the weight percentage (wt %).

Table 1 illustrates some embodiments of the steel composition, in weight percent (wt. %):

TABLE 1

Steel composition ranges (weight percent wt %)

| Element | P/O/I (*) | Composition Ranges | | | | | |
|---------|-----------|---------|---------|---------|---------|---------|---------|
| | | General | | Narrower | | Narrowest | |
| | | Minimum | Maximum | Minimum | Maximum | Minimum | Maximum |
| C  | P | 0.050  | 0.085  | 0.050  | 0.085  | 0.060  | 0.080  |
| Mn | P | 0.80   | 1.65   | 0.95   | 1.30   | 1.00   | 1.20   |
| Si | P | 0.10   | 0.45   | 0.10   | 0.35   | 0.10   | 0.30   |
| Cr | P | 0.10   | 0.70   | 0.20   | 0.50   | 0.30   | 0.40   |
| Ni | P | 0.08   | 0.45   | 0.15   | 0.40   | 0.25   | 0.35   |
| Mo | P | 0.08   | 0.40   | 0.15   | 0.40   | 0.30   | 0.35   |
| Nb | O | 0.000  | 0.040  | 0.020  | 0.040  | 0.020  | 0.030  |
| Ti | O | 0.000  | 0.020  | 0.000  | 0.015  | 0.000  | 0.015  |
| V  | I | 0.000  | 0.010  | 0.000  | 0.010  | 0.000  | 0.010  |
| Al | P | 0.015  | 0.040  | 0.020  | 0.040  | 0.020  | 0.030  |
| N  | P | 0.0030 | 0.0090 | 0.0030 | 0.0070 | 0.0030 | 0.0060 |
| Cu | I | 0.00   | 0.25   | 0.00   | 0.20   | 0.00   | 0.15   |
| S  | I | 0.000  | 0.0030 | 0.000  | 0.0020 | 0.000  | 0.0010 |
| P  | I | 0.000  | 0.015  | 0.000  | 0.015  | 0.000  | 0.011  |
| Ca | P | 0.0008 | 0.0050 | 0.0008 | 0.0030 | 0.0015 | 0.0030 |
| B  | I | 0.0000 | 0.0005 | 0.0000 | 0.0005 | 0.0000 | 0.0005 |
| Zr | O | 0.000  | 0.030  | 0.000  | 0.015  | 0.000  | 0.010  |
| Ta | O | 0.000  | 0.030  | 0.000  | 0.015  | 0.000  | 0.010  |

(*) P = Present; O = Optional; I = Impurity

Carbon (C) is an element whose addition to the steel composition can inexpensively raise the strength of the steel and refine the microstructure, reducing the transformation temperatures. If the C content of the steel composition is less than about 0.050%, it can be difficult to obtain the strength desired in the pipes. On the other hand, if the steel composition has a C content greater than about 0.085%, maximum hardness can be above 235 $HV_{10}$, toughness can be impaired, and weldability can decrease, making more difficult and expensive any welding process. Therefore, the C content of the steel composition can be selected within the range of 0.050% to 0.085%, and preferably within the range of 0.060% to 0.080%.

Manganese (Mn) is an element whose addition to the steel composition can be effective in increasing the hardenability, strength and toughness of the steel. If the Mn content of the steel composition is less than about 0.80% it can be difficult to obtain the desired strength in the steel. However, if the Mn content of the steel composition exceeds 1.65% banding structures can become marked, and toughness and HIC/SSC resistance can decrease. Therefore, the Mn content of the steel composition can be selected within the range of 0.80% to 1.65%, preferably within the range of 0.95% to 1.30%, and more preferably within the range of 1.00% to 1.20%.

Silicon (Si) is an element whose addition to the steel composition can have a deoxidizing effect during steel making process and can also raise the strength of the steel (e.g., solid solution strengthening). If the Si content of the steel composition is less than 0.10%, the steel can be poorly deoxidized during steelmaking process and can exhibit a high level of micro-inclusions. If the Si content of the steel composition exceeds 0.45%, both toughness and formability of the steel can decreases. Si content higher than about 0.45% can be also recognized to have a detrimental effect on surface quality when the steel is processed at high temperatures (e.g., temperatures greater than about 1000° C.) in oxidizing atmospheres, because surface oxide (scale) adherence can be increased due to fayalite formation and the risk of surface defect is higher. Therefore, the Si content of the steel composition can be selected within the range between 0.10% to 0.45%, preferably within the range of 0.10% to 0.35%, and more preferably within the range of 0.10% to 0.30%.

Chromium (Cr) is an element whose addition to certain embodiments of the steel composition can increase hardenability, decrease transformation temperatures, and increase tempering resistance of the steel. Therefore the addition of Cr to steel composition can be desirable for achieving high strength and toughness levels. If the Cr content of the steel composition is less than 0.10% it can be difficult to obtain the desired strength and toughness. On the other hand, if the Cr content of the steel composition exceeds about 0.70%, the cost can be excessive and toughness decreases due to enhanced precipitation of coarse carbides at grain boundaries. In addition, weldability of the resultant steel can be reduced, making the welding process more difficult and expensive. Therefore the Cr content of the steel composition can be selected within the range of 0.10% to 0.70%, preferably within the range of 0.20% to 0.50%, and more preferably within the range of 0.30% to 0.40%.

Nickel (Ni) is an element whose addition can increase the strength and toughness of certain embodiments of the steel. However, when Ni addition exceeds 0.45%, a more adherent scale has been observed, with higher risk of surface defect formation. Moreover, Ni contents higher than 1% can be recognized to have a detrimental effect on sulfide stress corrosion (SSC) cracking. Instead, if Ni content is lower than 0.08% the effect on toughness and strength can become negligible.

Therefore, the Ni content of certain embodiments of the steel composition can vary within the range of 0.08% to 0.45%, preferably within the range of 0.15% to 0.40%, and more preferably within the range of 0.25% to 0.35%.

Molybdenum (Mo) is an element whose addition to certain embodiments of the steel composition can improve hardenability and hardening by solid solution and fine precipitation. Mo can assist in retarding softening during tempering, promoting the formation of very fine MC and $M_2C$ precipitates. These particles can be substantially uniformly distributed in the matrix and also act as beneficial hydrogen traps, slowing down the atomic hydrogen diffusion towards the dangerous traps, usually at grain boundaries, which behave as crack nucleation sites. Mo can also reduce the segregation of phosphorous to grain boundaries, improving resistance to inter-granular fracture, with beneficial effects also on SSC resistance because high strength steels which suffer hydrogen embrittlement exhibit an inter-granular fracture morphology. By increasing the Mo content, the desired strength can be achieved at higher tempering temperatures, which can promote better toughness levels. In order to exert the effect thereof, the Mo content of the steel composition can be greater than or equal to 0.08%. However, for Mo contents higher than 0.40% weldability can be reduced. As Mo ferroalloy is expensive, the Mo content can be selected within the range of 0.08% to 0.40%, preferably within the range of 0.15% to 0.40%, and more preferably within the range of 0.30% to 0.35%.

Niobium (Nb) is an optional element whose addition to certain embodiments of the steel composition can be used to refine further the austenitic grain size during hot rolling and re-heating before quenching, as it can hinder the movement of grain boundaries acting both in solid solution and in the form of fine carbides and nitrides.

Nb can increase certain embodiments of the steel strength by particle dispersion hardening. These fine and round particles can be substantially uniformly distributed in the matrix and also can act as hydrogen traps, beneficially slowing down the atomic hydrogen diffusion towards the dangerous traps, usually at grain boundaries, which behave as crack nucleation sites. If the Nb content is higher than 0.040%, a coarse precipitate distribution that impairs toughness can be formed. Moreover, if the Nb content is higher than 0.040%, it can promote the formation of brittle zones in the heat affected zone (HAZ) of the girth weld. Therefore, the Nb content of the steel composition can be selected to be less than or equal to about 0.040% (0.000% possibly included), preferably greater than or equal to 0.020% and less than or equal to 0.040%, and more preferably greater than or equal to 0.020% and less than or equal to 0.030%. In some embodiments of the steel, niobium (Nb) can be an element with its content selected to be greater than or equal to 0.015% and less than or equal to 0.040%, preferably greater than or equal to 0.020% and less than or equal to 0.040%, and more preferably greater than or equal to 0.020% and less than or equal to 0.030%.

Titanium (Ti) is an optional element whose addition to certain embodiments of the steel composition can be provided to refine austenitic grain size in high temperature processes, forming nitrides and carbonitrides. When Ti is present in concentrations higher than 0.020%, coarse TiN particles can be formed that impair toughness. Accordingly, the Ti content of the steel composition can be less than or equal to 0.020% (0.000% possibly included), preferably less than or equal to 0.015%. In an alternative embodiment of the steel titanium (Ti) is an element with its content selected to be greater than or equal to 0.006% and less than or equal to 0.020%, preferably greater than or equal to 0.006% and less than or equal to 0.015%.

Vanadium (V) can be advantageously excluded from the chemical composition of certain embodiments of the steel. However vanadium may be present as an impurity element whose presence in the steel composition can increase strength by very fine carbonitride precipitation during tempering. However, if a significant volume fraction of vanadium carbide particles is formed, difficulties in maintaining high toughness levels and maximum hardness values lower than or equal to 235 $HV_{10}$ can be experienced after tempering. Therefore, the V content of the steel composition can be maintained to be less than or equal to 0.010%.

Aluminum (Al) is an element whose addition to certain embodiments of the steel composition can have a deoxidizing effect during steel making process and may refine the steel grain. Therefore, Al content can be equal to or greater than 0.015%, preferably equal to or greater than 0.020%. If the Al content of the steel composition is higher than about 0.040%, coarse precipitates of AlN that impair toughness and/or Al-rich oxides (e.g., non-metallic inclusions) that impair HIC and SSC resistance may be formed. Accordingly the Al content of the steel can be selected to be in the range of 0.015% to 0.040%, preferably in the range of 0.020% to 0.040%, and more preferably in the range of 0.020% to 0.030%.

Nitrogen (N) is an element whose presence within certain embodiments of the steel composition can contribute to form carbonitrides of Nb, Mo and Ti and can help to achieve the minimum strength. However if the N content of the steel composition exceeds 0.0090%, the toughness of the steel may be degraded. Therefore, the N content of the steel composition can be in the range of 0.0030 to 0.0090%, preferably within the range of 0.0030% to 0.0070%, and more preferably within the range of 0.0030% to 0.0060%.

Copper (Cu) is an impurity element that is not needed in certain embodiments of the steel composition. However, depending on the manufacturing process, the presence of Cu may be unavoidable. Therefore, the Cu content can be limited to as low as possible in order to maintain the risk of hot cracking (hot shortness) and defect formation induced by adherent scale at very low levels. For example the Cu content of the steel composition can be less than or equal to 0.25% (0.00% possibly included), preferably less than or equal to 0.20%, and more preferably less than or equal to 0.15%. Among the possible impurities copper is the element that can be present with higher wt % and its possible presence is due to the manufacturing process. These maximum limits are typical of a steel production route based on Electrical Arc Furnace (EAF) and use of scrap. Intensive recycling is now a common practice over the world for the production of long/tubular and flat products, and this recycling can determine the presence of copper as an impurity at the above mentioned levels.

Sulfur (S) is an impurity element that may decrease both toughness and workability of the steel, as well as HIC/SSC resistance. Accordingly, the S content of the steel can be kept as low as possible. For example the S content of the steel composition can be less than or equal to 0.0030% (0.0000% possibly included), preferably less than or equal to 0.0020%, and more preferably less than or equal to 0.0010%.

Phosphorous (P) is an impurity element that may cause the toughness and HIC/SSC resistance of certain embodiments of high strength steel to decrease. Accordingly, the P content can be kept as low as possible. For example the P content of the steel composition may be less than or equal to about 0.015% (0.000% possibly included), preferably less than or equal to about 0.011%.

Calcium (Ca) is an element whose addition to certain embodiments of the steel composition can assist with control of the shape of inclusions and enhancement of the HIC resistance by forming fine and substantially round sulfides. In order to provide these benefits, the Ca content of the steel composition can be selected to be greater than or equal to about 0.0008%. However, if the Ca content of the steel composition exceeds 0.0050% the effect of the Ca addition can be saturated and the risk of forming clusters of Ca-rich non-metallic inclusions that reduce HIC and SSC resistance can be increased. Accordingly, the Ca content of the steel composition can be selected to be within the range of 0.0008% to 0.0050%, preferably within the range of 0.0008% to 0.0030%, and more preferably within the range of 0.0015% to 0.0030%.

Boron (B) is an impurity element whose presence in certain embodiments of the steel composition can be undesired as it can increase steel hardenability and hardness in the HAZ. The upper limit of B content to avoid these detrimental effects can be about 0.0005%. Therefore, the maximum B content of the steel composition can be selected to be less than or equal to 0.0005% (0.0000% possibly included).

Zirconium (Zr) and tantalum (Ta) are optional elements that can act as strong carbide and nitride formers, similar to Nb and Ti. These elements can be optionally added to certain embodiments of the steel composition in order to produce Zr and Ta fine carbonitrides that can increase the steel strength by particle dispersion hardening and also act as beneficial hydrogen traps, slowing down the atomic hydrogen diffusion towards the dangerous traps. If the Zr or Ta content is greater than or equal to 0.030%, a coarse precipitate distribution that may impair toughness of the steel can be formed. Zirconium can also act as a deoxidizing element in the steel and combines with sulphur; however, as addition to steel in order to promote globular non-metallic inclusions, Ca can be preferred. Therefore, the content of Zr or Ta within the steel composition can be selected to be less than or equal to 0.030% (0.000% possibly included), preferably less than or equal to 0.015%, and more preferably less than or equal to 0.010%.

Figure 2:
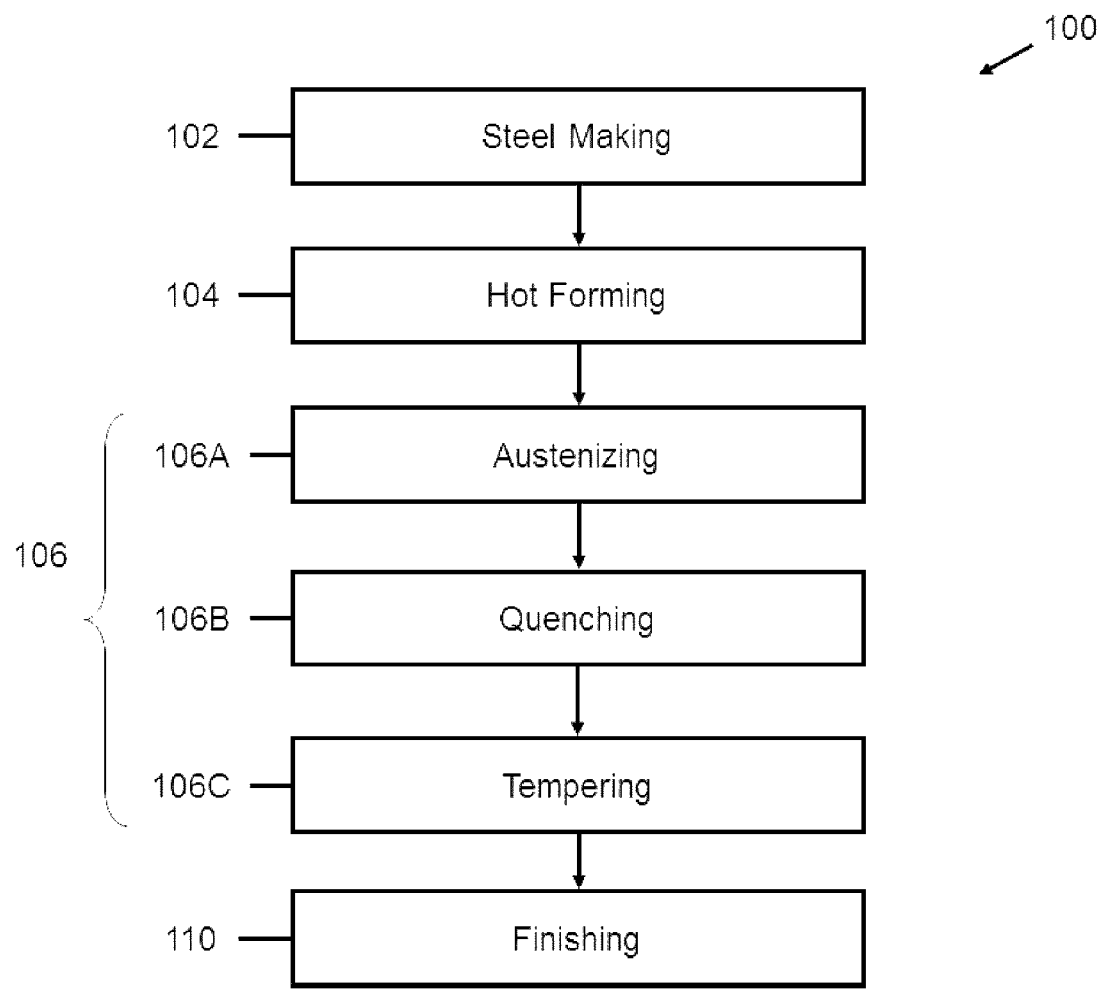
FIG. 2 illustrates a flow diagram of the process according to certain embodiments of the disclosure.

A process for manufacturing certain embodiments of the seamless steel pipes, is schematically illustrated in the flow diagram of FIG. 2. The process can include steelmaking operations 102; hot forming operations 104; heat treatment operations 106, which include austenitizing 106A, quenching 106B and tempering 106C; and finishing operations 110. Steelmaking operations to prepare the steel compositions of Table 1 and hot forming operations to produce a seamless steel pipe having a wall thickness in the range of 35 to 80 mm can include known methodologies.

In some embodiments, steelmaking operations 102 can comprise fabrication of the steel and production of a solid metal billet capable of being pierced and rolled to form a metallic tubular product. Selected steel scrap, cast iron, and sponge iron may be employed to prepare the raw material for the steel composition. Other sources of iron and/or steel may be employed for preparation of the steel composition.

Primary steelmaking may be performed using an electric arc furnace to melt the steel, decrease phosphorous and other impurities, and achieve a selected temperature. Tapping and deoxidation, and addition of alloying elements may be further performed.

In some embodiments, the steelmaking process can refine the iron by removal of impurities. In particular, sulfur and phosphorous are prejudicial for steel because they can degrade the mechanical properties of the steel and resistance to HIC and SSC. In some embodiments, secondary steelmaking may be performed in a ladle furnace and trimming station after primary steelmaking to perform specific purification steps.

During these operations, very low sulfur contents can be achieved within the steel, calcium inclusion treatment can be performed, and inclusion flotation can be performed. Inclusion flotation may be performed by bubbling inert gases in the ladle furnace to force inclusions and impurities to float. This technique can produce a fluid slag capable of absorbing impurities and inclusions. In this manner, high quality steel having the desired composition with low inclusion content can be provided.

Following the production of the melt steel having a composition within the ranges of Table 1, in some embodiments steel can be cast into a round solid billet having a substantially uniform diameter along the longitudinal axis thereof. For example, round billets having a diameter within the range between about 200 mm to about 420 mm may be produced in this manner.

The billet thus fabricated can be formed into a tubular product through hot forming processes 104 in some embodiments. A solid, cylindrical billet of clean steel may be heated to a temperature of about 1200° C. to 1340° C., preferably about 1280° C. For example, the billet may be reheated by a rotary hearth furnace. The billet can be further subject to a piercing and rolling operation. The billet can be pierced, for example using the Mannessmann effect, and a hot deformation process can be used to substantially reduce the outside diameter and wall thickness of the pipe, while the length is substantially increased. The piercing process may be performed at temperatures within the range between about 1200° C. to about 1300° C.

In some embodiments, the obtained hollow bars can be subjected to hot rolling at temperatures within the range between about 1000° C. and about 1200° C. in a retained mandrel continuous mill or similar/equivalent mill.

Accurate sizing may be then carried out by a sizing mill.

In some embodiments, the seamless pipes can be, after hot forming and before austenitizing, quenching and tempering, directly cooled in air, preferably still air, to about room temperature in a cooling bed. The air-cooled pipes can have a microstructure of ferrite and pearlite, due to the relatively slow cooling rate during cooling in still air between 800° C. and 500° C., said slow cooling rate being in the range of about 0.5-2° C./s, depending on thickness. Moreover, the air-cooled pipes can already contain fine precipitates (e.g. Nb and/or V carbo-nitrides) formed during air-cooling, which can be very effective in inhibiting austenite grain growth during reheating (austenitizing) before quenching. For example, pipes with outer diameters (OD) within the range between about 6 inches to about 16 inches may be formed in this manner.

In certain embodiments, after hot rolling the pipes may be in-line heated, without cooling at room temperature, by an intermediate furnace for making temperature more uniform, and accurate sizing may be carried out by a sizing mill. Subsequently, the seamless pipes can be immediately cooled in air, preferably still air, down to room temperature in a cooling bed in some embodiments.

In the case of a pipe having a final OD greater than about 16 inches, the pipes produced by a medium size mill may be processed by a rotary expansion mill in some embodiments. For example, medium size pipes may be reheated by a walking beam furnace to a temperature within the range between about 1150° C. to about 1250° C., expanded to the desired diameter by the expander mill at a temperature within the range between about 1100° C. to about 1200° C., and in-line reheated before final sizing.

In a non-limiting example, a solid bar may be hot formed as discussed above into a pipe possessing an outer diameter within the range of about 6 inches to about 28 inches and a wall thickness greater than or equal to 35 mm and less than or equal to 80 mm.

The final microstructure of certain embodiments of the formed pipe can be determined by the composition of the steel provided in steelmaking operations 102 and heat treatments performed in operations 106. The composition and microstructure, in turn, give rise to the properties of the formed pipe.

In some embodiments, the heat treatment operations 106, after having cooled the pipe in air to about room temperature, can include austenitizing, quenching and tempering (Q+T).

Therefore the process of certain embodiments of the disclosure can carry out an off-line quenching (or reheating quenching) which involves cooling the pipe down to room temperature, then heating the pipe until phase transformation to austenite has fully occurred, and finally quenching and tempering (reheating below Ac1, austenite start transformation point, followed by air cooling).

This off-line quenching, through austenite-ferrite-austenite transformation, can promote the refinement of the austenite grains and make them more uniform, when compared with the microstructure of in-line quenched material, especially in the case of heavy wall pipes.

A consequence of this process is that in some embodiments the average prior austenite grain size (AGS), measured as mean lineal intercept by ASTM Standard E112, is ≤25 μm, corresponding to a prior austenite grain size number higher than or equal to 7.3 according to the Japanese standard JIS G0551 or the same ASTM Standard E112, hereby incorporated by reference in their entirety, allowing to achieve a better toughness.

In some embodiments, the austenitizing operation can include reheating the pipe from about room temperature (reached after hot forming by means of the cooling in air) to a temperature that austenitizes the pipe followed by a rapid quench.

In particular, a heating of the seamless steel pipe can be carried out, with a heating rate between 0.1° C./s and 10° C./s, to an austenitizing temperature above the Ac3 transformation point, in a range between 880° C. and 980° C., and providing a soaking time between 180s and 5400s in certain embodiments.

In some embodiments, this heating of the austenitizing operation can be carried out in a gas-fired furnace provided with burners. The heat source during re-heating for austenitizing can be due to combustion of natural gas ($CH_4$). Therefore oxygen can be consumed during combustion, but advantageously oxygen concentration in the furnace can be less than 10%. Typically oxygen content can be in the range of 0.5% to 4% and decarburizing process can be very limited, with typical decarburizing depths of 0.05 mm to 0.15 mm (maximum value).

For example, the temperatures of the austenitizing furnace may be selected in order to allow the pipe to achieve the target austenitizing temperature with a tolerance lower than about +/−30° C. in certain embodiments. The austenitizing temperatures can be above the Ac3 transformation point, preferably in the range between 900° C. to 960° C., more preferably in the range between 920° C. and 930° C. The heating rate may be selected within the range between 0.5° C./s to 8° C./s. The soaking time, the time from when the pipe achieves the final target temperature minus 10° C. to the exit of the pipe from the furnace, may be selected within the range between 300 s to 3600 s in some embodiments. Austenitizing temperatures and soaking times may be selected depending on chemical composition, wall thickness, and desired austenite grain size. At the exit of the furnace, the pipe may be descaled, for example by high pressure water, to remove the surface oxide and is rapidly moved, preferably in less than 120 s, to a quenching system, for example a water quenching system.

In some embodiments of the quenching operations 106B, external and internal cooling can be employed to achieve the desired cooling rates, at about the mid-thickness of the pipe, greater than about 6° C./s, preferably in the range between 7° C./s and 30° C./s, more preferably in the range of 8° C./s to 20° C./s. Instead, in proximity of the outer and inner surfaces of the pipe, in particular at 1.5-2 mm depth from said surfaces, the cooling rate can be in the range between 100 and 200° C./s.

For example, in some embodiments a water quenching can be performed by dipping the pipe in a tank containing stirred water. The pipe can be rapidly rotated during quenching to make the heat transfer high and uniform and avoid pipe distortion. Additionally, in order to remove the steam developed inside the pipe, an inner water jet may also be employed. The water temperature may not be higher than about 40° C., preferably less than about 30° C. during quenching operations 106B. Advantageously the pipe during immersion in the water tank can be under rotation and a water jet can be ejected by a nozzle inside the pipe in order to remove steam and avoid film formation. In this manner a uniform and effective quenching can be carried out because a film boiling state can be avoided. In fact, in case of a film boiling state, the heat transfer is not so homogeneous along the pipe and lower cooling rates are obtained at mid-wall, with the risk that the desired yield strength may not be achieved.

In some embodiments, after said quenching operations 106B the seamless steel pipes, having a chemical composition according one of the embodiments of Table 1 and a wall thickness greater than or equal to 35 mm and less than or equal to 80 mm, promote, in the global microstructure of the steel pipe, the formation of a volume percent of bainite greater than 50%, preferably greater than 60% and more preferably greater than 80%, and lower than or equal to 90%.

FIG. 1 illustrates a Continuous Cooling Transformation (CCT) diagram of a steel, with composition within the ranges of Table 1, generated by dilatometry. FIG. 1 clearly indicates that globally, along the wall thickness, a predominant bainitic microstructure can be formed, with a volume percent of bainite from 60% to 90% for a wide range of cooling rates, from 6° C./s to 100° C./s, with other minor microstructural constituents formed by ferrite and martensite.

In particular, in some embodiments, at mid thickness the microstructure of the quenched steel pipe can comprise in volume percentage bainite greater than or equal to 50% and ferrite ($V_F$), for example fine polygonal ferrite, lower than or equal to 50%, with smaller amounts of MA constituent (high-C martensite and retained austenite islands). Preferably bainite can be greater than or equal to 60% and ferrite ($V_F$) can be lower than or equal to 40%. More preferably bainite can be greater than or equal to 80% and ferrite ($V_F$) can be lower than or equal to 20%. MA constituent can be present in volume fractions up to approximately 12%.

Advantageously, at distances up to approximately 2 mm from outer or inner surface of the steel pipes, in some embodiments the microstructure of the quenched steel pipe can be constituted of martensite with volume percentages lower than 70%, preferably lower than 40%, and most preferably lower than 20% (measured according with ASTM E562-08, hereby incorporated by reference in its entirety) and of bainite in a volume percentage higher than 30%, preferably higher than 60%, most preferably higher than 80%. Martensite and bainite can be formed at temperatures lower than 450° C. and 600° C., respectively, after re-heating at austenitizing temperatures in the range of 900° C.

to 960° C. for soaking times between 300 s to 3600 s, and quenching at cooling rates equal or greater than 6° C./s, preferably in the range of 7 to 30° C./s at mid thickness.

In addition, the average prior austenite grain size, measured by ASTM Standard E112, can be advantageously smaller than 25 μm (lineal intercept) in certain embodiments.

The average size of regions separated by high angle boundaries (i.e. the packet size) can be advantageously smaller than 9 μm, preferably smaller than 7 μm, most preferably smaller than 5 μm in some embodiments. Said packet size is measured as average lineal intercept on images taken by Scanning Electron Microscopy (SEM) using the Electron Back Scattered Diffraction (EBSD) signal, and considering high-angle boundaries those with misorientation >15°.

In some embodiments, after quenching operation 106B, the pipe can be introduced in another furnace for the tempering operations 106C, comprising a heating of the seamless steel pipe to a tempering temperature in a range between 600° C. and 680° C., and providing a holding time at said tempering temperature between 600s and 7200s.

The tolerances for the selected tempering temperature can be within the range of about ±15° C. in some embodiments. The pipe can be heated at a rate between about 0.1° C./s to about 10° C./s to the selected tempering temperature. The pipe can be further held at the selected tempering temperature for a duration of time preferably within the range between 600 s and 5400 s.

The tempering temperature can be selected within the range between about 600° C. to about 680° C. depending on the chemical composition of the steel and the grade to be achieved in certain embodiments.

In certain embodiments, the optimum tempering temperature range can be calculated with a tolerance of ±20° C., preferably of ±10° C., using the following equation 3:

$$T(° C.) = \frac{1000 \times (-1.42 + C + 1.84 \times Mn + 4.6 \times Cr + 11.6 \times Mo + 25 \times V)}{a - 3.8 \times C + 1.5 \times Mn + 4.3 \times Cr + 10.7 \times Mo + 20 \times V} - 273.15 \quad \text{(eq. 3)}$$

where a is a parameter whose value is −0.07, 0.16 or 0.40 if the grade to be achieved is the X60, X65 or X70, respectively. The symbol "x" is a multiplication sign and the symbols for the chemical elements represent the value of the weight percentage (wt %).

For example, if the tempering temperature calculated by means of the equation 3 is equal to 647° C. (according the chemical composition of the example 5, see below, for a grade X60 steel pipe), the optimum tempering range is from 627° C. to 667° C., whereby the tempering temperature can be chosen within this optimum range.

In particular, in some embodiments, at mid thickness the microstructure of the quenched and tempered steel pipe can comprise in volume percentage tempered bainite greater than or equal to 50% and ferrite (VF), for example fine polygonal ferrite, lower than or equal to 50%, while the MA constituent can be absent because during tempering MA islands decompose in ferrite and carbides, such as a decomposition requiring temperatures higher than 550° C. and being necessary not to impair the toughness of the final product. In some embodiments, bainite can be greater than or equal to 60% and ferrite (VF) can be lower than or equal to 40%. In some embodiments, tempered bainite can be greater than or equal to 80% and ferrite (VF) can be lower than or equal to 20%.

Advantageously, in some embodiments, at distances up to approximately 2 mm from outer or inner surface of the steel pipes, the microstructure of the quenched and tempered steel pipe can be constituted of tempered martensite with volume percentages lower than 70%, preferably lower than 40%, and most preferably lower than 20% (measured according with ASTM E562-08) and of tempered bainite in a volume percentage higher than 30%, preferably higher than 60%, most preferably higher than 80%.

After tempering, the microstructure can have an average prior austenite grain size, measured by ASTM Standard E112 hereby incorporated by reference in its entirety, advantageously smaller than 25 μm (lineal intercept) in some embodiments.

In some embodiments, the average size of regions separated by high angle boundaries (i.e. the packet size) can be advantageously smaller than 9 μm, preferably smaller than 7 μm, most preferably smaller than 5 μm. By forming a microstructure including tempered bainite, as opposed to a banded microstructure (e.g., ferrite-pearlite), the HIC resistance of the steel pipe can be further increased. Said packet size can be measured as average lineal intercept on images taken by Scanning Electron Microscopy (SEM) using the Electron Back Scattered Diffraction (EBSD) signal, and considering high-angle boundaries those with misorientation >15°.

The tempered microstructure may also include presence of fine precipitates of MX, M2X type (where M is Mo, Nb, or Cr and X is C or N) with size less than 40 nm, in addition to precipitates of the type M3C with an average diameter of about 80 nm to about 400 nm (measured by Transmission Electron Microscopy) in certain embodiments.

In certain embodiments, finishing operations 110 may include, but are not limited to, straightening and hot bending operations.

In some embodiments, straightening may be performed at temperatures below the tempering temperature and above about 450° C.

In some embodiments, bending of quenched and tempered seamless pipe may be performed by hot induction. Hot induction bending is a hot deformation process which concentrates in a narrow zone, referred to as hot tape, that is defined by an induction coil (e.g., a heating ring) and a quenching ring that sprays water on the external surface of the structure to be bent. A straight (mother) pipe can be pushed from its back, while the front of the pipe can be clamped to an arm constrained to describe a circular path. This constraint can provoke a bending moment on the entire structure, but the pipe can be plastically deformed substantially only within the zone corresponding to the hot tape. The quenching ring plays therefore two simultaneous roles: to define the zone under plastic deformation and to in-line quench the hot bend.

The diameter of both heating and quenching rings can be about 20 mm to about 60 mm larger than the outside diameter (OD) of the mother pipe in some embodiments. The bending temperature, for example in the range 800-870° C., at both exterior and interior surfaces of the pipe may be continuously measured by pyrometers. The bending rate can be preferably within the range 10-25 mm/min.

In conventional fabrication, the bends may be subjected to a stress relieving treatment after bending and quenching by a tempering treatment at a relatively low temperature to achieve the final mechanical properties in some embodiments.

However, it is recognized that the in-line quenching and tempering operations performed during finishing operations 110 may produce a microstructure that is different than that obtained from the off-line quenching and tempering operations 106B, 106C. Therefore, as discussed above in operations 106B, 106C, in certain embodiments, in order to substantially regenerate the microstructure obtained after operations 106B and 106C, the bends can be advantageously subjected to off-line quenching and tempering in some embodiments. The bends can be reheated in a furnace at a rate within the range 0.05° C./s to approximately 1° C./s at a temperature between 900° C. and 960° C., and then rapidly immersed into a quenching tank with stirred water and then tempered in a furnace. The temper after bending can be performed at a temperature within the range between about 600° C. to about 680° C. The pipe can be heated at a rate within the range between about 0.05° C./s to approximately 1° C./s. A holding time within the range between about 600 s to about 5400 s may be employed after the target tempering temperature has been achieved.

The steel pipes of certain embodiments of the present disclosure, having a wall thickness higher than or equal to 35 mm and lower or equal to 80 mm, having a chemical composition according to Table 1, being subjected to the above mentioned manufacturing process including austenitizing, quenching and tempering operations, and having the above mentioned microstructure after tempering, can cover the grades X60Q and/or X65Q and/or X70Q.

A steel pipe of grade X65Q, having a WT greater than or equal to 35 mm and less than or equal to 80 mm and the composition and microstructure discussed above, can possess the following properties in some embodiments:

Yield strength, YS: 450 MPa (65.3 ksi) minimum and 600 MPa (87.0 ksi) maximum.
Ultimate Tensile Strength, UTS: 535 MPa (77.6 ksi) minimum and 760 MPa (110.2) maximum.
Elongation, not less than 20%, referred to a circular cross section test piece of diameter 12.5 mm.
YS/UTS ratio not higher than 0.88.
Maximum hardness (measured at 1.5 mm depth from the pipe surface) not higher than 230 $HV_{10}$, more preferably not higher than 225 $HV_{10}$.
Minimum impact energy of 200 J/150 J (average/individual) and minimum 85% of average shear area for both longitudinal and transverse Charpy V-notch (CVN) tests performed on standard size specimens at −40° C. according with standard ISO 148-1, hereby incorporated by reference in its entirety.
Ductile-Brittle Transformation Temperature (ASTM E23 hereby incorporated by reference in its entirety) less than or equal to about −60° C.
HIC resistance, assessed according with NACE Standard TM0284-2003 Item No. 21215 hereby incorporated by reference in its entirety, using NACE solution A and test duration 96 hours, with the following HIC parameters (average on three sections of three specimens):
Crack Length Ratio, CLR≤10%
Crack Thickness Ratio, CTR≤3%
Crack Sensitivity Ratio, CSR≤0.5%
SSC resistance, assessed in accordance with ASTM G39 hereby incorporated by reference in its entirety, using NACE TM0177 test solution A hereby incorporated by reference in its entirety and a duration of 720 hours, with no failure at 90% of the actual yield stress (AYS).

A steel pipe of grade X60Q, having a WT greater than or equal to 35 mm and less than or equal to 80 mm and the composition and microstructure discussed above, can possess the following properties in some embodiments:

Yield strength, YS: 415 MPa (60.2 ksi) minimum and 565 MPa (81.9 ksi) maximum.
Ultimate Tensile Strength, UTS: 520 MPa (75.4 ksi) minimum and 760 MPa (110.2 ksi) maximum.
Elongation, not less than 20%, referred to a circular cross section test piece of diameter 12.5 mm.
YS/UTS ratio not higher than 0.87.
Maximum hardness (measured at 1.5 mm to 2.0 mm depth from the pipe surface) not higher than 225 $HV_{10}$.
Minimum impact energy of 200 J/150 J (average/individual) and minimum 85% of average shear area for both longitudinal and transverse Charpy V-notch (CVN) tests performed on standard size specimens at −40° C. according with standard ASTM A 370.
Ductile-Brittle Transformation Temperature (ASTM E23) less than or equal to about −60° C.
HIC resistance, assessed according with NACE Standard TM0284-2003 Item No. 21215, using NACE solution A and test duration 96 hours, with the following HIC parameters (average on three sections of three specimens):
Crack Length Ratio, CLR≤10%
Crack Thickness Ratio, CTR≤3%
Crack Sensitivity Ratio, CSR≤0.5%
SSC resistance, assessed in accordance with ASTM G39, using NACE TM0177 test solution A and a duration of 720 hours, with no failure at 90% of the actual yield stress (AYS).

A steel pipe of grade X70Q, having a WT greater than or equal to 35 mm and less than or equal to 55 mm and the composition and microstructure discussed above, can possess the following properties in some embodiments:

Yield strength, YS: 485 MPa (70.3 ksi) minimum and 635 MPa (92.1 ksi) maximum.
Ultimate Tensile Strength, UTS: 570 MPa (83 82.7 ksi) minimum and 760 MPa (110.2 ksi) maximum.
Elongation, not less than 18%, referred to a circular cross section test piece of diameter 12.5 mm.
YS/UTS ratio no higher than 0.90.
Maximum hardness (measured at 1.5 mm to 2.0 mm depth from the pipe surface) not higher than 235 $HV_{10}$.
Minimum impact energy of 200 J/150 J (average/individual) and minimum 85% of average shear area for both longitudinal and transverse Charpy V-notch (CVN) tests performed on standard size specimens at −40° C. according with standard ASTM A 370.
Ductile-Brittle Transformation Temperature (ASTM E23) less than or equal to about −60° C.
HIC resistance, assessed according with NACE Standard TM0284-2003 Item No. 21215, using NACE solution A and test duration 96 hours, with the following HIC parameters (average on three sections of three specimens):
Crack Length Ratio, CLR≤10%
Crack Thickness Ratio, CTR≤3%
Crack Sensitivity Ratio, CSR≤0.5%
SSC resistance, assessed in accordance with ASTM G39, using NACE TM0177 test solution A and a duration of 720 hours, with no failure at 90% of the actual yield stress (AYS).

In order to achieve these results, the minimum hardenability requirements (P2) and microstructural limitations about the ferrite content can be according to the following table in some embodiments:

|  | X60Q | X65Q | X70Q |
|---|---|---|---|
| P2 | ≥2.3 | ≥2.7 | ≥3.5 |
| Max. Ferrite volume fraction at mid thickness | 50%, preferably 40% | 40%, preferably 30% | 20%, preferably 10% |

Moreover, bends of grade X65Q having a WT greater than or equal to 35 mm and less than or equal to 80 mm and the composition and microstructure discussed above can possess the same properties of the pipe of grade X65Q, with maximum hardness (measured at 1.5 mm to 2 mm depth from the surface) not higher than 235 HV10, more preferably not higher than 230 HV10 in some embodiments.

Instead, bends of grade X60Q having a WT greater than or equal to 35 mm and less than or equal to 80 mm and the composition and microstructure discussed above can possess the same properties of the pipe of grade X60Q, with maximum hardness (measured at 1.5 mm to 2 mm depth from the surface) not higher than 230 HV10, more preferably not higher than 225 HV10 in some embodiments.

Some embodiments of steel pipes according to the disclosure can have the following chemical composition:

TABLE 2

| Element | P/O/I (*) | Minimum | Maximum |
|---|---|---|---|
| C | P | 0.060 | 0.085 |
| Mn | P | 0.95 | 1.30 |
| Si | P | 0.10 | 0.35 |
| Cr | P | 0.20 | 0.40 |
| Ni | P | 0.25 | 0.40 |
| Mo | P | 0.25 | 0.35 |
| Nb | O | 0.020 | 0.040 |
| Ti | O | 0.000 | 0.015 |
| V | I | 0.000 | 0.010 |
| Al | P | 0.020 | 0.040 |
| N | P | 0.0030 | 0.0070 |
| Cu | I | 0.00 | 0.20 |
| S | I | 0.000 | 0.0020 |
| P | I | 0.000 | 0.015 |
| Ca | P | 0.0008 | 0.0030 |
| B | I | 0.0000 | 0.00005 |
| Zr | O | 0.000 | 0.010 |
| Ta | O | 0.000 | 0.010 |

(*) P = Present; O = Optional; I = Impurity and can satisfy the following additional conditions:
P1=50×C+Cr+10×Mo+70×V in the range from 6.3 to 8.0;
P2=10×C+Mn+Cr+4×Mo+16×V in the range from 2.75 to 3.8;
$CE_{IIW}$=C+Mn/6+(Cr+Mo+V)/5+(Cu+Ni)/15 in the range from 0.38% to 0.43%;
$CE_{PCM}$=C+Si/30+Mn/20+Cr/20+Cu/20+Ni/60+Mo/15+V/10+5×B in the range from 0.17% to 0.21%.

Advantageously the steel pipe, after the hot forming, can be subjected to the following steps in some embodiments:
cooling the steel pipe in air, preferably still air, up to reach the room temperature;
heating the steel pipe, with a heating rate between 0.1° C./s and 10° C./s, to an austenitizing temperature in the range between 900° C. and 960° C., and providing a soaking time between 180s and 3600s;
quenching in a tank, achieving a cooling rate of 7-30° C./s at mid thickness and a cooling rate of 100-200° C./s in proximity of the outer and inner surfaces of the pipe, in particular at 1.5-2 mm depth from said surfaces;
heating the steel pipe, with a heating rate between 0.1° C./s and 10° C./s, to a tempering temperature between 600° C. and 680° C. and providing a holding time at said tempering temperature between 600s and 5400s.

Some embodiments of seamless steel pipes can comprise the following pipes:
X60Q steel pipes having a wall thickness higher than 55 mm;
X65Q steel pipes having a wall thickness higher than or equal to 35 mm and lower to or equal to 55 mm;
X70Q steel pipes having a wall thickness higher than or equal to 35 mm and lower to or equal to 40 mm.

In some embodiments, the titanium content can be in the range 0.006-0.0015%.

Some embodiments of steel pipes according to the disclosure can have the following chemical composition:

TABLE 3

| Element | P/O/I (*) | Minimum | Maximum |
|---|---|---|---|
| C | P | 0.050 | 0.080 |
| Mn | P | 0.95 | 1.20 |
| Si | P | 0.10 | 0.35 |
| Cr | P | 0.10 | 0.30 |
| Ni | P | 0.15 | 0.35 |
| Mo | P | 0.15 | 0.30 |
| Nb | O | 0.020 | 0.040 |
| Ti | O | 0.000 | 0.015 |
| V | I | 0.00 | 0.010 |
| Al | P | 0.020 | 0.040 |
| N | P | 0.0030 | 0.0070 |
| Cu | I | 0.00 | 0.20 |
| S | I | 0.000 | 0.0020 |
| P | I | 0.000 | 0.015 |
| Ca | P | 0.0008 | 0.0030 |
| B | I | 0.0000 | 0.00005 |
| Zr | O | 0.000 | 0.010 |
| Ta | O | 0.000 | 0.010 |

(*) P = Present; O = Optional; I = Impurity and can satisfy the following additional conditions:
P1=50×C+Cr+10×Mo+70×V in the range from 4.2 to 7.5;
P2=10×C+Mn+Cr+4×Mo+16×V in the range from 2.31 to 3.66;
$CE_{IIW}$=C+Mn/6+(Cr+Mo+V)/5+(Cu+Ni)/15 in the range from 0.36% to 0.41%;
$CE_{PCM}$=C+Si/30+Mn/20+Cr/20+Cu/20+Ni/60+Mo/15+V/10+5×B in the range from 0.16% to 0.21%.

Advantageously the steel pipe, after the hot forming, can be subjected to the following steps in some embodiments:
cooling the steel pipe in air, preferably still air, up to reach the room temperature;
heating the steel pipe, with a heating rate between 0.1° C./s and 10° C./s, to an austenitizing temperature in the range between 900° C. and 960° C., and providing a soaking time between 180 s and 3600 s;
quenching in a tank, achieving a cooling rate of 7-30° C./s at mid thickness and a cooling rate of 100-200° C./s in proximity of the outer and inner surfaces of the pipe, in particular at 1.5-2 mm depth from said surfaces;
heating the steel pipe, with a heating rate between 0.1° C./s and 10° C./s, to a tempering temperature between 600° C. and 680° C. and providing a holding time at said tempering temperature between 600 s and 5400 s.

Said embodiment of seamless steel pipes can comprise X60Q steel pipes having a wall thickness higher than or equal to 35 mm and lower to or equal to 55 mm.

In some embodiments, the titanium content can be in the range 0.006-0.0015%.

EXAMPLES

Below some examples according to the present disclosure are disclosed. In each example the chemical composition of the selected steel, the process parameters regarding the steps of austenitizing, quenching and tempering, the microstructure along the wall thickness of the pipe and the maximum hardness value detected along the whole thickness of the pipe are indicated. In all the examples the maximum hardness value is below 235 $HV_{10}$, and yield strength, toughness and corrosion resistance satisfy at least one of the grades X60Q, X65Q and X70Q.

The methodology used for the characterization of the Q&T pipes and bends is here summarized:

The microstructural constituents through the wall thickness were analysed by optical microscopy after Nital 2% etching. The prior austenitic grain size was measured after polishing and etching with Winsteard solution, based on picric acid in saturated $H_2O$ solution. The grain size was measured according to ASTM E112 mean lineal intercept method, hereby incorporated by reference in its entirety.

High angle domains (packet size) were analysed by Electron back scattering diffraction (EBSD), applying the ASTM E112 mean linear intercept method to determine the average packet size.

Hydrogen Induced Cracking (HIC) test were carried out according to NACE TM 02-84/2011 Standard, hereby incorporated by reference in its entirety.

The four point bend test (FPBT) was carried out according to the standard ASTM G39, using NACE TM 02-84/2011 Solution A, hereby incorporated by reference in its entirety.

The tensile tests were carried out according to ASTM A 370, hereby incorporated by reference in its entirety, using round specimens ½ inch diameter taken from mid thickness in both longitudinal and transverse direction.

Toughness was tested by Charpy V-Notch impact tests, carried out according to ASTM A370, hereby incorporated by reference in its entirety. The specimens were taken either from mid thickness either at 2 mm from the outer diameter. Temperatures between −40° C. and −120° C. were tested and the 50% fracture appearance transition temperature (FATT) was used as a parameter to characterize material toughness.

Hardness was tested with four indentations per sector at 1.5 mm (−0 to +0.5 mm) from OD (outer diameter), at mid thickness and at 1.5 mm (−0 to +0.5 mm) from ID (inner diameter), following ISO 3183 and DNV-OS-F101 specifications, hereby incorporated by reference in their entirety. Four specimens taken at 90° along the circumference from both tail and head of three tubes per heat treatment lot were tested.

Example 1

A steel with the following chemical composition has been selected: 0.062% C, 1.23% Mn, 0.26% Si, 0.51% Cr, 0.31% Ni, 0.11% Mo, 0.023% Al, 0.0008% Ca, 0.025% Nb, 0.005% Ti, 0.0045% N, the remaining being iron and impurities;

said impurities being 0.001% V, 0.13% Cu, 0.0024% S, 0.007% P, 0.0001% B; and being P1=4.8; P2=2.8; $CE_{IIW}$=0.42%; and $CE_{PCM}$=0.18%.

A seamless steel pipe has been hot formed, having a wall thickness of 40 mm.

Said hot formed steel pipe has been subjected to the following steps:
  cooling the steel pipe in air, preferably still air, up to reach the room temperature;
  heating the steel pipe, with a heating rate of 0.2° C./s, to an austenitizing temperature of 920° C. and providing a soaking time of 1200 s;
  quenching in a tank, achieving a cooling rate of 17° C./s at mid thickness and a cooling rate of about 100° C./s in proximity of the outer and inner surfaces of the pipe, in particular at 1.5-2 mm depth from said surfaces;
  heating the steel pipe, with a heating rate of 0.15° C./s, to a tempering temperature of 600° C. and providing a holding time of 2400 s at said tempering temperature.

The resulting microstructure of the steel pipe comprises, in volume percentage:
  at mid thickness, tempered bainite equal to about 84% and ferrite ($V_F$) equal to about 16%,
  at a distance up to 2 mm starting from outer and inner surfaces of the steel pipe, tempered martensite absent and tempered bainite equal to 100%.

The average prior austenite grain size, measured according to ASTM E112, is equal to 14 µm. The packet size is equal to 5.5 µm.

The maximum hardness value, measured at 1.5-2.0 mm depth from the outer and inner surfaces, is equal to 225 $HV_{10}$ (<230 $HV_{10}$).

The minimum and maximum yield strength values were 456 MPa and 461 MPa respectively (grade X65).

The minimum and maximum tensile strength values were 549 MPa and 559 MPa respectively.

The minimum and maximum elongation % after rupture were 24% and 25%, respectively.

The average impact energy at −60° C. was 305 J, with an average shear area of 100%.

The average 50% FATT was at −120° C.

Hydrogen Induced cracking tests passed with CLR %=0%, CTR %=0% and CSR %=0%.

Four point bend tests at 90% of SMYS passed with no failures after 720 h of tests.

Example 2

A steel with the following chemical composition has been selected:
  0.058% C, 1.00% Mn, 0.25% Si, 0.69% Cr, 0.31% Ni, 0.12% Mo, 0.025% Al, 0.0009% Ca, 0.024% Nb, 0.005% Ti, 0.0045% N, the remaining being iron and impurities;
  said impurities being 0.001% V, 0.12% Cu, 0.0026% S, 0.009% P, 0.0001% B; and being P1=4.9; P2=2.8; $CE_{IIW}$=0.42%; and $CE_{PCM}$=0.17%.

A seamless steel pipe has been hot formed, having a wall thickness of 40 mm.

Said hot formed steel pipe has been subjected to the following steps:
  cooling the steel pipe in air, preferably still air, up to reach the room temperature;
  heating the steel pipe, with a heating rate of 0.2° C./s, to an austenitizing temperature of 920° C. and providing a soaking time of 1200 s;

quenching in a tank, achieving a cooling rate of 17° C./s at mid thickness and a cooling rate of about 100° C./s in proximity of the outer and inner surfaces of the pipe, in particular at 1.5-2 mm depth from said surfaces;

heating the steel pipe, with a heating rate of 0.15° C./s, to a tempering temperature of 620° C. and providing a holding time of 2400 s at said tempering temperature.

The resulting microstructure of the steel pipe comprises, in volume percentage:

at mid thickness, tempered bainite equal to about 86% and ferrite ($V_F$) equal to about 14%, at a distance up to 2 mm starting from outer and inner surfaces of the steel pipe, tempered martensite absent and tempered bainite equal to 100%.

The average prior austenite grain size, measured according to ASTM E112, is equal to 12 µm. The packet size is equal to 5.2 µm.

The maximum hardness value, measured at 1.5-2.0 mm depth from the outer and inner surfaces, is equal to 199 $HV_{10}$ (<230 $HV_{10}$).

The minimum and maximum yield strength values were 473 MPa and 476 MPa respectively (grade X65).

The minimum and maximum tensile strength values were 564 MPa and 567 MPa respectively.

The minimum and maximum elongation % after rupture were 25% and 26%, respectively.

The average impact energy at −60° C. was 310 J, with an average shear area of 100%.

The average 50% FATT was at −110° C.

Hydrogen Induced cracking tests passed with CLR %=0%, CTR %=0% and CSR %=0%.

Four point bend tests at 90% of SMYS passed with no failures after 720 h of tests.

Example 3

A steel with the following chemical composition has been selected:

0.069% C, 1.64% Mn, 0.36% Si, 0.16% Cr, 0.30% Ni, 0.11% Mo, 0.025% Al, 0.0010% Ca, 0.025% Nb, 0.005% Ti, 0.0050% N, the remaining being iron and impurities;

said impurities being 0.001% V, 0.10% Cu, 0.0026% S, 0.009% P, 0.0001% B; and being P1=4.8; P2=2.9; $CE_{IIW}$=0.42%; and $CE_{PCM}$=0.19%.

A seamless steel pipe has been hot formed, having a wall thickness of 40 mm.

Said hot formed steel pipe has been subjected to the following steps:

cooling the steel pipe in air, preferably still air, up to reach the room temperature;

heating the steel pipe, with a heating rate of 0.2° C./s, to an austenitizing temperature of 920° C. and providing a soaking time of 1200 s;

quenching in a tank, achieving a cooling rate of 20° C./s at mid thickness and a cooling rate of about 120° C./s in proximity of the outer and inner surfaces of the pipe, in particular at 1.5-2 mm depth from said surfaces;

heating the steel pipe, with a heating rate of 0.15° C./s, to a tempering temperature of 600° C. and providing a holding time of 2400 s at said tempering temperature.

The resulting microstructure of the steel pipe comprises, in volume percentage:

at mid thickness, tempered bainite equal to about 81% and ferrite ($V_F$) equal to about 19%, at a distance up to 2 mm starting from outer and inner surfaces of the steel pipe, tempered martensite absent and tempered bainite equal to 100%.

The average prior austenite grain size, measured according to ASTM E112, is equal to 9.5 µm. The packet size is equal to 5.9 µm.

The maximum hardness value, measured at 1.5-2.0 mm depth from the outer and inner surfaces, is equal to 221 $HV_{10}$ (<230 $HV_{10}$).

The minimum and maximum yield strength values were equal to 479 MPa and 500 MPa, respectively (grade X65).

The minimum and maximum tensile strength values were 562 MPa and 587 MPa respectively.

The minimum and maximum elongation % after rupture were equal to 24% and 26%, respectively.

The average impact energy at −60° C. was 310 J, with a minimum value of 285 J, and an average shear area of 100%.

The average 50% FATT was at −105° C.

Hydrogen Induced cracking tests passed with CLR %=0%, CTR %=0% and CSR %=0%.

Four point bend tests at 90% of SMYS passed with no failures after 720 h of tests.

Example 4

A steel with the following chemical composition has been selected:

0.065% C, 1.00% Mn, 0.26% Si, 0.49% Cr, 0.33% Ni, 0.33% Mo, 0.023% Al, 0.0011% Ca, 0.024% Nb, 0.005% Ti, 0.0044% N, the remaining being iron and impurities;

said impurities being, 0.001% V, 0.13% Cu, 0.0024% S, 0.009% P, 0.0001% B; and being P1=7.1; P2=3.5; $CE_{IIW}$=0.43%; and $CE_{PCM}$=0.18%.

A seamless steel pipe has been hot formed, having a wall thickness of 50 mm.

Said hot formed steel pipe has been subjected to the following steps:

cooling the steel pipe in air, preferably still air, up to reach the room temperature;

heating the steel pipe, with a heating rate of 0.12° C./s, to an austenitizing temperature of about 920° C. and providing a soaking time of about 600 s;

quenching in a tank, achieving a cooling rate of 12° C./s at mid thickness and a cooling rate of about 100° C./s in proximity of the outer and inner surfaces of the pipe, in particular at 1.5-2 mm depth from said surfaces;

heating the steel pipe, with a heating rate of 0.15° C./s, to a tempering temperature of about 645° C. and providing a holding time of about 2400 s at said tempering temperature.

The resulting microstructure of the steel pipe comprises, in volume percentage:

at mid thickness, tempered bainite equal to about 83% and ferrite ($V_F$) equal to about 17%, at a distance up to 2 mm starting from outer and inner surfaces of the steel pipe, tempered martensite absent and tempered bainite equal to 100%.

The average prior austenite grain size, measured according to ASTM E112, is equal to 13 µm. The average packet size is equal to 5.4 µm.

The maximum hardness value, measured at 1.5-2.0 mm depth from the outer and inner surfaces, is equal to 214 $HV_{10}$ (<230 $HV_{10}$).

The minimum and maximum yield strength values were 492 MPa and 524 MPa respectively (grade X65).

The minimum and maximum tensile strength values were 573 MPa and 599 MPa respectively.

The minimum and maximum elongation % after rupture were 22% and 27%, respectively.

The average impact energy at −60° C. was 298 J, with an individual minimum value of 292 J, with an average shear area of 100%.

The average 50% FATT was at −85° C.

Hydrogen Induced cracking tests passed with CLR %=0%, CTR %=0% and CSR %=0%

Four point bend tests at 90% of SMYS passed with no failures after 720 h of tests.

Example 5

A steel with the following chemical composition has been selected:
0.062% C, 1.23% Mn, 0.31% Si, 0.35% Cr, 0.26% Ni, 0.16% Mo, 0.023% Al, 0.0008% Ca, 0.025% Nb, 0.01% Ti, 0.0045% N, the remaining being iron and impurities;
said impurities being, 0.001% V, 0.13% Cu, 0.0024% S, 0.007% P, 0.0001% B; and being P1=5.1; P2=2.9; $CE_{IIW}$=0.40%; and $CE_{PCM}$=0.17%.

A seamless steel pipe has been hot formed, having a wall thickness of 40 mm.

Said hot formed steel pipe has been subjected to the following steps:
cooling the steel pipe in air, preferably still air, up to reach the room temperature;
heating the steel pipe, with a heating rate of 0.15° C./s, to an austenitizing temperature of about 920° C. and providing a soaking time of about 600 s;
quenching in a tank, achieving a cooling rate of 15° C./s at mid thickness and a cooling rate of about 150° C./s in proximity of the outer and inner surfaces of the pipe, in particular at 1.5-2 mm depth from said surfaces;
heating the steel pipe, with a heating rate of 0.15° C./s, to a tempering temperature of about 640° C. and providing a holding time of about 2400 s at said tempering temperature.

The resulting microstructure of the steel pipe comprises, in volume percentage:
at mid thickness, tempered bainite equal to about 68% and ferrite ($V_F$) equal to about 32%,
at a distance up to 2 mm starting from outer and inner surfaces of the steel pipe, tempered martensite equal to about 20% and tempered bainite equal to about 80%.

The average prior austenite grain size, measured according to ASTM E112, is equal to 13.5 μm. The average packet size is equal to 5.5 μm.

The maximum hardness value, measured at 1.5-2.0 mm depth from the outer and inner surfaces, is equal to 215 $HV_{10}$ (<230 $HV_{10}$).

The minimum and maximum yield strength values were 448 MPa and 459 MPa respectively (grade X60).

The minimum and maximum tensile strength values were 546 MPa and 557 MPa respectively.

The minimum and maximum elongation % after rupture were 29% and 32%, respectively.

The average impact energy at −60° C. was 398 J, with an individual minimum value of 355 J, with an average shear area of 100%.

The average 50% FATT was at −105° C.

Hydrogen Induced cracking tests passed with CLR %=0%, CTR %=0% and CSR %=0%

Four point bend tests at 90% of SMYS passed with no failures after 720 h of tests.

Example 6

A steel with the following chemical composition has been selected:
0.070% C, 1.01% Mn, 0.27% Si, 0.39% Cr, 0.30% Ni, 0.33% Mo, 0.031% Al, 0.0011% Ca, 0.024% Nb, 0.002% Ti, 0.0047% N, the remaining being iron and impurities;
said impurities being, 0.003% V, 0.09% Cu, 0.001% S, 0.011% P, 0.0002% B; and being P1=7.4; P2=3.5; $CE_{IIW}$=0.41%; and $CE_{PCM}$=0.18%.

A seamless steel pipe has been hot formed, having a wall thickness of 52 mm.

Said hot formed steel pipe has been subjected to the following steps:
cooling the steel pipe in air, preferably still air, up to reach the room temperature;
heating the steel pipe, with a heating rate of 0.15° C./s, to an austenitizing temperature of about 930° C. and providing a soaking time of about 600 s;
quenching in a tank, achieving a cooling rate of 12° C./s at mid thickness and a cooling rate of about 150° C./s in proximity of the outer and inner surfaces of the pipe, in particular at 1.5-2 mm depth from said surfaces;
heating the steel pipe, with a heating rate of 0.15° C./s, to a tempering temperature of about 650° C. and providing a holding time of about 1800 s at said tempering temperature.

The resulting microstructure of the steel pipe comprises, in volume percentage:
at mid thickness, tempered bainite equal to about 78% and ferrite ($V_F$) equal to about 22%,
at a distance up to 2 mm starting from outer and inner surfaces of the steel pipe, tempered martensite equal to about 60% and tempered bainite equal to about 40%.

The average prior austenite grain size, measured according to ASTM E112, is equal to 23 μm. The average packet size is equal to 7.6 μm.

The maximum hardness value, measured at 1.5-2.0 mm depth from the outer and inner surfaces, is equal to 221 $HV_{10}$ (<230 $HV_{10}$).

The minimum and maximum yield strength values were 480 MPa and 537 MPa respectively (grade X65).

The minimum and maximum tensile strength values were 578 MPa and 630 MPa respectively.

The minimum and maximum elongation % after rupture were 27% and 33%, respectively.

The average impact energy at −60° C. was 376 J, with an individual minimum value of 204 J, an average shear area of 95% and a minimum shear area of 50%.

The average 50% FATT was at −90° C.

Hydrogen Induced cracking tests passed with CLR %=0%, CTR %=0% and CSR %=0%

Four point bend tests at 90% of SMYS passed with no failures after 720 h of tests.

Example 7

A steel with the following chemical composition has been selected:
0.070% C, 1.01% Mn, 0.27% Si, 0.39% Cr, 0.30% Ni, 0.33% Mo, 0.031% Al, 0.0011% Ca, 0.024% Nb, 0.002% Ti, 0.0047% N, the remaining being iron and impurities;

said impurities being, 0.003% V, 0.09% Cu, 0.001% S, 0.011% P, 0.0002% B; and being P1=7.4; P2=3.5; $CE_{IIW}$=0.41%; and $CE_{PCM}$=0.18%.

A seamless steel pipe has been hot formed, having a wall thickness of 40 mm.

Said hot formed steel pipe has been subjected to the following steps:

cooling the steel pipe in air, preferably still air, up to reach the room temperature;

heating the steel pipe, with a heating rate of 0.15° C./s, to an austenitizing temperature of about 930° C. and providing a soaking time of about 600 s;

quenching in a tank, achieving a cooling rate of 14° C./s at mid thickness and a cooling rate of about 150° C./s in proximity of the outer and inner surfaces of the pipe, in particular at 1.5-2 mm depth from said surfaces;

heating the steel pipe, with a heating rate of 0.15° C./s, to a tempering temperature of about 640° C. and providing a holding time of about 1800 s at said tempering temperature.

The resulting microstructure of the steel pipe comprises, in volume percentage:

at mid thickness, tempered bainite equal to about 82% and ferrite ($V_F$) equal to about 18%, at a distance up to 2 mm starting from outer and inner surfaces of the steel pipe, tempered martensite equal to about 60% and tempered bainite equal to about 40%.

The average prior austenite grain size, measured according to ASTM E112, is equal to 22 μm. The average packet size is equal to 7.0 μm.

The maximum hardness value, measured at 1.5-2.0 mm depth from the outer and inner surfaces, is equal to 227 $HV_{10}$ (<230 $HV_{10}$).

The minimum and maximum yield strength values were 491 MPa and 525 MPa respectively (grade X70).

The minimum and maximum tensile strength values were 582 MPa and 605 MPa respectively.

The minimum and maximum elongation % after rupture were 26% and 27%, respectively.

The average impact energy at −60° C. was 290 J, with an individual minimum value of 220 J, an average shear area of 95% and a minimum shear area of 80%.

The average 50% FATT was at −90° C.

Hydrogen Induced cracking tests passed with CLR %=0%, CTR %=0% and CSR %=0%

Four point bend tests at 90% of SMYS passed with no failures after 720 h of tests.

Example 8

A steel with the following chemical composition has been selected:

0.070% C, 1.01% Mn, 0.27% Si, 0.39% Cr, 0.30% Ni, 0.33% Mo, 0.031% Al, 0.0011% Ca, 0.024% Nb, 0.002% Ti, 0.0047% N, the remaining being iron and inevitable impurities;

said impurities being, 0.003% V, 0.09% Cu, 0.001% S, 0.011% P, 0.0002% B; and being P1=7.4; P2=3.5; $CE_{IIW}$=0.41%; and $CE_{PCM}$=0.18%.

A seamless steel pipe has been hot formed, having a wall thickness of 56 mm.

Said hot formed steel pipe has been subjected to the following steps:

cooling the steel pipe in air, preferably still air, up to reach the room temperature;

heating the steel pipe, with a heating rate of 0.10° C./s, to an austenitizing temperature of about 930° C. and providing a soaking time of about 600 s;

quenching in a tank, achieving a cooling rate of 9° C./s at mid thickness and a cooling rate of about 150° C./s in proximity of the outer and inner surfaces of the pipe, in particular at 1.5-2 mm depth from said surfaces;

heating the steel pipe, with a heating rate of 0.15° C./s, to a tempering temperature of about 675° C. and providing a holding time of about 1800 s at said tempering temperature.

The resulting microstructure of the steel pipe comprises, in volume percentage:

at mid thickness, tempered bainite equal to about 70% and ferrite ($V_F$) equal to about 30%, at a distance up to 2 mm starting from outer and inner surfaces of the steel pipe, tempered martensite equal to about 60% and tempered bainite equal to about 40%.

The average prior austenite grain size, measured according to ASTM E112, is equal to 23 μm. The average packet size is equal to 7.5 μm.

The maximum hardness value, measured at 1.5-2.0 mm depth from the outer and inner surfaces, is equal to 229 $HV_{10}$ (<230 $HV_{10}$).

The minimum and maximum yield strength values were 448 MPa and 476 MPa respectively (grade X60).

The minimum and maximum tensile strength values were 551 MPa and 572 MPa respectively.

The minimum and maximum elongation % after rupture were 27% and 28%, respectively.

The average impact energy at −60° C. was 237 J, with an individual minimum value of 234 J, an average shear area of 82% and a minimum shear area of 80%.

The average 50% FATT was at −90° C.

Hydrogen Induced cracking tests passed with CLR %=0%, CTR %=0% and CSR %=0%

Four point bend tests at 90% of SMYS passed with no failures after 720 h of tests.

Example 9

A steel with the following chemical composition has been selected:

0.075% C, 1.05% Mn, 0.25% Si, 0.20% Cr, 0.29% Ni, 0.25% Mo, 0.030% Al, 0.0010% Ca, 0.022% Nb, 0.003% Ti, 0.0050% N, the remaining being iron and impurities;

said impurities being, 0.01% V, 0.13% Cu, 0.002% S, 0.010% P, 0.0002% B; and being P1=7.2; P2=3.2; $CE_{IIW}$=0.37%; and $CE_{PCM}$=0.18%.

A seamless steel pipe has been hot formed, having a wall thickness of 52 mm.

Said hot formed steel pipe has been subjected to the following steps:

cooling the steel pipe in air, preferably still air, up to reach the room temperature;

heating the steel pipe, with a heating rate of 0.10° C./s, to an austenitizing temperature of about 930° C. and providing a soaking time of about 600 s;

quenching in a tank, achieving a cooling rate of 10° C./s at mid thickness and a cooling rate of about 150° C./s in proximity of the outer and inner surfaces of the pipe, in particular at 1.5-2 mm depth from said surfaces;

heating the steel pipe, with a heating rate of 0.15° C./s, to a tempering temperature of about 660° C. and providing a holding time of about 1800 s at said tempering temperature.

The resulting microstructure of the steel pipe comprises, in volume percentage:
  at mid thickness, tempered bainite equal to about 65% and ferrite ($V_F$) equal to about 35%,
  at a distance up to 2 mm starting from outer and inner surfaces of the steel pipe, tempered martensite equal to about 50% and tempered bainite equal to about 50%.

The average prior austenite grain size, measured according to ASTM E112, is equal to 17 μm. The average packet size is equal to 6.8 μm.

The maximum hardness value, measured at 1.5-2.0 mm depth from the outer and inner surfaces, is equal to 224 $HV_{10}$ (<230 $HV_{10}$).

The minimum and maximum yield strength values were 445 MPa and 456 MPa respectively (grade X60).

The minimum and maximum tensile strength values were 551MPa and 560 MPa respectively (grade X70).

The minimum and maximum elongation % after rupture were 28% and 31%, respectively.

The average impact energy at −60° C. was 335 J, with an individual minimum value of 294 J, an average shear area of 95% and a minimum shear area of 90%.

The average 50% FATT was at −100° C.

Hydrogen Induced cracking tests passed with CLR %=0%, CTR %=0% and CSR %=0%

Four point bend tests at 90% of SMYS passed with no failures after 720 h of tests.

Example 10

Steel pipes having outer diameter 323.9 mm and wall thickness of 52 mm, made according to the procedure described in example 8, were selected to manufacture Q&T bends of the same wall thickness.

The following chemical composition was used:
  0.070% C, 1.01% Mn, 0.27% Si, 0.39% Cr, 0.30% Ni, 0.33% Mo, 0.031% Al, 0.0011% Ca, 0.024% Nb, 0.002% Ti, 0.0047% N, the remaining being iron and inevitable impurities;
  said impurities being, 0.003% V, 0.09% Cu, 0.001% S, 0.011% P, 0.0002% B; and being P1=7.4; P2=3.5; $CE_{IIW}$=0.41%; and $CE_{PCM}$=0.18%.

The steel pipe were subjected to the following steps:
  hot induction bending at a temperature comprised between 800 and 870° C. and subjected to a bending rate comprised between 10 and 25 mm/min. The bends were manufactured with radius equal to three times the outer diameter and tangent length of 1 m;
  heating the bend, with a heating rate of 0.10° C./s, to an austenitizing temperature of about 920° C. and providing a soaking time of about 600 s;
  quenching in a tank, achieving a cooling rate of about 8° C./s at mid thickness in the bend body and a cooling rate of about 150° C./s in proximity of the outer and inner surfaces of the pipe, in particular at 1.5-2 mm depth from said surfaces;
  heating the bend, with a heating rate of 0.10° C./s, to a tempering temperature of about 660° C. and providing a holding time of about 600 s at said tempering temperature.

The resulting microstructure of the steel pipe comprises, in volume percentage:
  at mid thickness, tempered bainite equal to about 70% and ferrite ($V_F$) equal to about 30%,
  at a distance up to 2 mm starting from outer and inner surfaces of the steel pipe, tempered martensite equal to about 65% and tempered bainite equal to about 35%.

The average prior austenite grain size, measured according to ASTM E112, is equal to 24 μm. The average packet size is equal to 7.2 μm.

The maximum hardness value, measured at 1.5-2.0 mm depth from the outer and inner surfaces, is equal to 230 $HV_{10}$ (≤230 $HV_{10}$).

The minimum and maximum yield strength values were 452 MPa and 484 MPa respectively (grade X65).

The minimum and maximum tensile strength values were 550 MPa and 584 MPa respectively.

The minimum and maximum elongation % after rupture were 30% and 32.5%, respectively.

The average impact energy at −60° C. was 337 J and an average shear area of 100%.

The average 50% FATT was at −90° C.

Hydrogen Induced cracking tests passed with CLR %=0%, CTR %=0% and CSR %=0%

Four point bend tests at 90% of SMYS passed with no failures after 720 h of tests.

Example 11

A steel with the following chemical composition has been selected:
  0.080% C, 1.35% Mn, 0.28% Si, 0.22% Cr, 0.20% Ni, 0.34% Mo, 0.025% Al, 0.0008% Ca, 0.0054% N, the remaining being iron;
  and being P1=7.3; P2=3.6; $CE_{IIW}$=0.43%; and $CE_{PCM}$=0.19%.

A seamless steel pipe has been hot formed, having a wall thickness of 36 mm.

Said hot formed steel pipe has been subjected to the following steps:
  cooling the steel pipe in air, preferably still air, up to reach the room temperature;
  heating the steel pipe, with a heating rate of 0.2° C./s, to an austenitizing temperature of 900° C. and providing a soaking time of 1200 s;
  quenching in a tank, achieving a cooling rate of 18° C./s at mid thickness and a cooling rate of about 100° C./s in proximity of the outer and inner surfaces of the pipe, in particular at 1.5-2 mm depth from said surfaces;
  heating the steel pipe, with a heating rate of 0.15° C./s, to a tempering temperature of 650° C. and providing a holding time of 1200s at said tempering temperature.

The resulting microstructure of the steel pipe comprises, in volume percentage:
  at mid thickness, tempered bainite equal to about 80% and ferrite ($V_F$) equal to about 20%,
  at a distance up to 2 mm starting from outer and inner surfaces of the steel pipe, tempered martensite about 25% and tempered bainite about 75%.

The average prior austenite grain size, measured according to ASTM E112, is equal to 18 μm. The packet size is equal to 6.5 μm.

The maximum hardness value, measured at 1.5-2.0 mm depth from the outer and inner surfaces, is equal to 225 $HV_{10}$ (<230 $HV_{10}$).

The minimum and maximum yield strength values were 491 MPa and 499 MPa respectively (grade X65, but also compliant with grades X60 and X70).

The minimum and maximum tensile strength values were 590 MPa and 605 MPa respectively.

The minimum and maximum elongation % after rupture were 23% and 26%, respectively.

The average impact energy at −60° C. was 252 J with an individual minimum of 230 J, an average shear area of 85% and a minimum shear area of 75%.

The average 50% FATT was at −75° C.

Hydrogen Induced cracking tests passed with CLR %=0%, CTR %=0% and CSR %=0%.

Four point bend tests at 90% of SMYS passed with no failures after 720 h of tests.

From the foregoing description, it will be appreciated that inventive material and methods of manufacturing have been disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using and medical applications for the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A seamless quenched and tempered steel pipe comprising:
   a yield strength from 415 MPa to 635 MPa and a wall thickness (WT) higher than or equal to 35 mm and lower than or equal to 80 mm;
   wherein the steel pipe has a chemical composition consisting of:
   0.050-0.085 wt % C;
   0.80-1.65 wt % Mn;
   0.10-0.45 wt % Si;
   0.10-0.70 wt % Cr;
   0.08-0.45wt % Ni;
   0.08-0.40 wt % Mo;
   0.015-0.040 wt % Al;
   0.0008-0.0050 wt % Ca;
   0.0030-0.0090 wt % N;
   0.000-0.040 wt % Nb;
   0.000-.020 wt % Ti;
   0.000-0.030 wt % Zr;
   0.000-0.030 wt % Ta;
   0.000-0.010 wt % V;
   0.000-0.25 wt % Cu;
   0.000-0.003 wt % S;
   0.000-0.015 wt % P; and
   0.000-0.0005 wt % B;
   the remainder being Fe;
   wherein $CE_{IIW}=C+Mn/6+(Cr+Mo+V)/5+(Cu+Ni)/15$ is in the range of 0.36% to 0.43%;
   wherein, defining a first parameter $P1=50\times C+Cr+10\times Mo+70\times V$, the chemical composition satisfies a first condition $4.2<P1<8.0$;
   wherein the quenched and tempered steel pipe has, at mid thickness, a microstructure comprising, in volume percentage, tempered bainite greater than or equal to 50% and ferrite ($V_F$) lower than or equal to 50%,
   wherein the quenched and tempered steel pipe has, at a distance up to 2 mm starting from outer and inner surfaces of the steel pipe, a microstructure comprising, in volume percentage, tempered martensite lower than 70% and tempered bainite higher than 30%;

wherein the microstructure of the quenched and tempered steel pipe has an average prior austenite grain size, measured by ASTM Standard E112, smaller than 25 µm;

and wherein the maximum hardness values, measured at 1.5-2.0 mm depth from the outer and inner surfaces, are not higher than 235 $HV_{10}$.

2. The seamless quenched and tempered steel pipe of claim 1, wherein, at a distance up to 2 mm starting from outer and inner surfaces of the steel pipe, the microstructure comprises tempered martensite lower than 40% and tempered bainite higher than 60%.

3. The seamless quenched and tempered steel pipe of claim 2, wherein, at a distance up to 2 mm starting from outer and inner surfaces of the steel pipe, the microstructure comprises tempered martensite lower than 20% and tempered bainite higher than 80%.

4. The seamless quenched and tempered steel pipe of claim 2, wherein, at a distance up to 2 mm starting from outer and inner surfaces of the steel pipe, the microstructure only comprises tempered bainite.

5. The seamless quenched and tempered steel pipe of claim 1, wherein, at mid thickness, the microstructure comprises tempered bainite greater than or equal to 60% and ferrite ($V_F$) lower than or equal to 40%.

6. The seamless quenched and tempered steel pipe of claim 1, wherein, at mid thickness, the microstructure comprises tempered bainite greater than or equal to 80% and ferrite ($V_F$) lower than or equal to 20%.

7. The seamless quenched and tempered steel pipe of claim 1, wherein, at mid thickness, the microstructure comprises ferrite ($V_F$) lower than or equal to 50% for a pipe of grade X60, ferrite ($V_F$) lower than or equal to 40% for a pipe of grade X65, ferrite ($V_F$) lower than or equal to 20% for a pipe of grade X70.

8. The seamless quenched and tempered steel pipe of claim 1, wherein, defining a second parameter P2=10×C+Mn+Cr+4×Mo+16×V, the chemical composition satisfies a second condition P2>2.3.

9. The seamless quenched and tempered steel pipe of claim 8, wherein the second parameter P2 satisfies the following conditions:
P2>2.3 in order to meet the minimum yield strength required by the grade X60Q (415 MPa);
P2>2.7 in order to meet the minimum yield strength required by the grade X65Q (450 MPa); and
P2>3.5 in order to meet the minimum yield strength required by the grade X70Q (485 MPa).

10. The seamless quenched and tempered steel pipe of claim 8, wherein the second parameter P2 is lower than or equal to 4.0.

11. The seamless quenched and tempered steel pipe of claim 1, wherein:
$CE_{PCM}$=C+Si/30+Mn/20+Cr/20+Cu/20+Ni/60+Mo/15+V/10+5×B is in the range of 0.17% to 0.22%.

12. The seamless quenched and tempered steel pipe of claim 1, wherein the chemical composition consists of:
0.050-0.085 wt % C;
0.95-1.30 wt % Mn;
0.10-0.35 wt % Si;
0.20-0.50 wt % Cr;
0.15-0.40 wt % Ni;
0.15-0.40 wt % Mo;
0.000-0.010 wt % V;
0.020-0.040 wt % Al;
0.0008-0.0030 wt % Ca;
0.020-0.040 wt % Nb;
0.000-0.015 wt % Ti;
0.0030-0.0070 wt % N;
0.00-0.20 wt % Cu;
0.0000-0.0020 wt % S;
0.000-0.015 wt % P;
0.0000-0.0005 wt % B;
0.000-0.015 wt % Zr; and
0.000-0.015 wt % Ta;
the remainder being Fe.

13. The seamless quenched and tempered steel pipe of claim 1, wherein the chemical composition consists of:
0.060-0.080 wt % C;
1.00-1.20 wt % Mn;
0.10-0.30 wt % Si;
0.30-0.40 wt % Cr;
0.25-0.35 wt % Ni;
0.30-0.35 wt % Mo;
0.000-0.010 wt % V;
0.020-0.030 wt % Al;
0.0015-0.0030 wt % Ca;
0.020-0.030 wt % Nb;
0.000-0.015 wt % Ti;
0.0030-0.0060 wt % N;
0.00-0.15 wt % Cu;
0.0000-0.0010 wt % S;
0.000-0.011 wt % P;
0.0000-0.0005 wt % B;
0.000-0.010 wt % Zr; and
0.000-0.010 wt % Ta;
the remainder being Fe.

14. The seamless quenched and tempered steel pipe of claim 1, wherein the chemical composition consists of:
0.060-0.085 wt % C;
0.95-1.30 wt % Mn;
0.10-0.35 wt % Si;
0.20-0.40 wt % Cr;
0.25-0.40 wt % Ni;
0.25-0.35 wt % Mo;
0.000-0.010 wt % V;
0.020-0.040 wt % Al;
0.0008-0.0030 wt % Ca;
0.020-0.040 wt % Nb;
0.000-0.015 wt % Ti;
0.0030-0.0070 wt % N;
0.00-0.20 wt % Cu;
0.0000-0.0020 wt % S;
0.000-0.015 wt % P;
0.0000-0.0005 wt % B;
0.000-0.015 wt % Zr; and
0.000-0.015 wt % Ta;
the remainder being Fe;
and satisfies the following additional conditions:
P1=50×C+Cr+10×Mo+70×V in the range from 6.3 to 8.0;
P2=10×C+Mn+Cr+4×Mo+16×V in the range from 2.75 to 3.8;
$CE_{IIW}$=C+Mn/6+(Cr+Mo+V)/5+(Cu+Ni)/15 in the range from 0.38% to 0.43%; and
$CE_{PCM}$=C+Si/30+Mn/20+Cr/20+Cu/20+Ni/60+Mo/15+V/10+5×B in the range from 0.17% to 0.21%.

15. The seamless quenched and tempered steel pipe according to claim 1, wherein the chemical composition consists of:
0.050-0.080 wt % C;
0.95-1.20 wt % Mn;

0.10-0.35 wt % Si;
0.10-0.30 wt % Cr;
0.15-0.35wt % Ni;
0.15-0.30 wt % Mo;
0.000-0.010 wt % V;
0.020-0.040 wt % Al;
0.0008-0.0030 wt % Ca;
0.020-0.040 wt % Nb;
0.000-0.015 wt % Ti;
0.0030-0.0070 wt % N;
0.00-0.20 wt % Cu;
0.0000-0.0020 wt % S;
0.000-0.015 wt % P;
0.0000-0.0005 wt % B;
0.000-0.015 wt % Zr; and
0.000-0.015 wt % Ta;
the remainder being Fe;
and satisfies the following additional conditions:
P1=50×C+Cr+10×Mo+70×V in the range from 4.2 to 7.5;
P2=10×C+Mn+Cr+4×Mo+16×V in the range from 2.31 to 3.66
$CE_{IIW}$=C+Mn/6+(Cr+Mo+V)/5+(Cu+Ni)/15 in the range from 0.36% to 0.41%; and
$CE_{PCM}$=C+Si/30+Mn/20+Cr/20+Cu/20+Ni/60+Mo/15+V/10+5×B in the range from 0.16% to 0.21%.

16. A method for manufacturing a seamless quenched and tempered steel pipe comprising:
hot forming a seamless steel pipe having a wall thickness (WT) higher than or equal to 35 mm and lower than or equal to 80 mm and a chemical composition consisting of:
0.050-0.085 wt % C;
0.80-1.65 wt % Mn;
0.10-0.45 wt % Si;
0.10-0.70 wt % Cr;
0.08-0.45 wt % Ni;
0.08-0.40 wt % Mo;
0.015-0.040 wt % Al;
0.0008-0.0050 wt % Ca;
0.0030-0.0090 wt % N;
0.000-0.040 wt % Nb;
0.000-0.020 wt % Ti;
0.000-0.030 wt % Zr;
0.000-0.030 wt % Ta;
0.000-0.010 wt % V;
0.00-0.25 wt % Cu;
0.000-0.003 wt % S;
0.000-0.015 wt % P; and
0.0000-0.0005 wt % B;
the remainder being Fe;
cooling in air the seamless steel pipe down to reach room temperature;
heating the seamless steel pipe, with a first heating rate between 0.1° C./s and 10° C./s, to an austenitizing temperature above the Ac3 transformation point, in a range between 880° C. and 980° C., and providing a soaking time between 180 s and 5400 s;
quenching the seamless steel pipe using external and internal cooling, with a cooling rate greater than 6° C./s and up to 30° C./s at mid thickness of the pipe, and with a cooling rate of 100-200° C./s in proximity of the outer and inner surfaces of the pipe;
heating the seamless steel pipe, with a second heating rate between 0.1° C./s and 10° C./s, to a tempering temperature comprised in a predetermined range, and providing a holding time at said tempering temperature between 600 s and 7200 s;
wherein said predetermined range is calculated with a tolerance of ±20° C. using the following equation:

$$T(° C.) = \frac{1000 \times (-1.42 + C + 1.84 \times Mn + 4.6 \times Cr + 11.6 \times Mo + 25 \times V)}{a - 3.8 \times C + 1.5 \times Mn + 4.3 \times Cr + 10.7 \times Mo + 20 \times V} - 273.15$$

where a is a parameter having a value equal to −0.07, 0.16 or 0.40 if the grade to be achieved is X60Q, X65Q or X70Q, respectively; and
wherein the final steel pipe has yield strength from 415 MPa to 635 MPa.

17. A pipe bend, obtained by a seamless steel pipe of claim 1, having maximum hardness values, measured at 1.5 mm to 2 mm depth from the surface, not higher than 235 $HV_{10}$.

18. The pipe bend of claim 17, having a maximum hardness values, measured at 1.5 mm to 2 mm depth from the surface, not higher than 230 $HV_{10}$.

* * * * *

UNITED STATES PATENT AND TRADEMARK OFFICE
CERTIFICATE OF CORRECTION

| | |
|---|---|
| PATENT NO. | : 9,644,248 B2 |
| APPLICATION NO. | : 14/248116 |
| DATED | : May 9, 2017 |
| INVENTOR(S) | : Ettore Anelli et al. |

It is certified that error appears in the above-identified patent and that said Letters Patent is hereby corrected as shown below:

On the Title Page

In Column 2 (item (56)) at Line 11, Under Other Publications, change "Purposes≥Technical" to --Purposes-Technical--.

In Column 1 (page 5, item (56)) at Line 51, Under Other Publications, change "N°" to --No.--.

In Column 1 (page 5, item (56)) at Line 63, Under Other Publications, change "Pergamom" to --Pergamon--.

In Column 1 (page 5, item (56)) at Line 64, Under Other Publications, change "Britan." to --Britain.--.

In Column 2 (page 5, item (56)) at Line 6, Under Other Publications, change "N°" to --No.--.

In Column 2 (page 5, item (56)) at Line 29, Under Other Publications, change "Baintitic" to --Bainitic--.

In Column 2 (page 5, item (56)) at Line 63, Under Other Publications, change "Role Role" to --Role--.

In Column 1 (page 6, item (56)) at Line 3, Under Other Publications, change ""Moessbauer" to --"Mössbauer--.

In Column 1 (page 6, item (56)) at Line 10, Under Other Publications, change "Geochemica et Cosmochemica" to --Geochimica et Cosmochimica--.

In Column 1 (page 6, item (56)) at Line 28, Under Other Publications, change "Tempuratures"," to --Temperatures",--.

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,644,248 B2

In Column 1 (page 6, item (56)) at Line 43, Under Other Publications, change "Tublar" to --Tubular--.

In Column 1 (page 6, item (56)) at Line 46, Under Other Publications, change "Pergamom" to --Pergamon--.

In Column 1 (page 6, item (56)) at Line 67, Under Other Publications, change "(Brasil)," to --(Brazil),--.

In Column 1 (page 6, item (56)) at Line 67, Under Other Publications, change "n°" to --no.--.

In Column 2 (page 6, item (56)) at Line 5, Under Other Publications, change "microstruture" to --microstructure--.

In Column 2 (page 6, item (56)) at Line 8, Under Other Publications, change ""Moessbauer" to --"Mössbauer--.

In Column 2 (page 6, item (56)) at Line 44, Under Other Publications, change "allowy" to --alloy--.

In Column 2 (page 6, item (56)) at Line 52, Under Other Publications, change "Anoxid" to --Anoxic--.

In Column 2 (page 6, item (56)) at Line 59, Under Other Publications, change ""Metakkurgical" to --"Metallurgical--.

In Column 2 (page 6, item (56)) at Line 61, Under Other Publications, change "Brasil." to --Brazil.--.

In Column 1 (page 7, item (56)) at Line 5, Under Other Publications, change "Commssion" to --Commission--.

In Column 1 (page 7, item (56)) at Line 12, Under Other Publications, change "(GTAVV)" to --(GTAW)--.

In the Drawings

Sheet 2 of 2 (Reference Numeral 106A, FIG. 2) at Line 1, Change "Austenizing" to --Austenitizing--.

In the Specification

In Column 5 at Line 27, Change "CSR≤0.5%." to --CSR≤0.5%--.

In Column 7 at Line 30, Change "Zr," to --Zr;--.

In Column 8 at Line 21, Change "3.66" to --3.66;--.
In Column 9 at Line 25, Change "else wherein" to --elsewhere in--.

In Column 29 at Line 22 (approx.), Change "Winsteard" to --Winstead--.

In Column 33 at Line 10, After "0%" insert --.--.

In Column 33 at Line 67, After "0%" insert --.--.

In Column 34 at Line 56, After "0%" insert --.--.

In Column 35 at Line 47, After "0%" insert --.--.

In Column 36 at Line 36, After "0%" insert --.--.

In Column 37 at Line 17, Change "551MPa" to --551 MPa--.

In Column 37 at Line 25, After "0%" insert --.--.

In Column 38 at Line 18 (approx.), After "0%" insert --.--.

In the Claims

In Column 40 at Line 41, In Claim 1, change "0.45wt" to --0.45 wt--.

In Column 40 at Line 60, In Claim 1, change "4.2<P1<8.0;" to --$4.2 \leq P1 \leq 8.0$;--.

In Column 41 at Line 41, In Claim 8, change "P2>2.3." to --$P2 \geq 2.3$.--.

In Column 41 at Line 45, In Claim 9, change "P2>2.3." to --$P2 \geq 2.3$.--.

In Column 41 at Line 47, In Claim 9, change "P2>2.7." to --$P2 \geq 2.7$.--.

In Column 41 at Line 49, In Claim 9, change "P2>3.5" to --$P2 \geq 3.5$--.

In Column 43 at Line 3, In Claim 15, change "0.35wt" to --0.35 wt--.

In Column 44 at Line 13 (approx.), In Claim 16, after "using" insert --an--.